(12) United States Patent
Devir et al.

(10) Patent No.: US 11,129,341 B2
(45) Date of Patent: Sep. 28, 2021

(54) HEAT DELIVERY SYSTEM AND METHOD

(71) Applicant: ROOTS SUSTAINABLE AGRICULTURAL TECHNOLOGIES LTD., Kefar Netter (IL)

(72) Inventors: Sharon Devir, Kefar Vitkin (IL); Yakov Weisman, Kefar Netter (IL); Eran Fridman, Kefar Netter (IL); Erez Zimhoni, Kfar Hes (IL); Boaz Wachtel, Kefar Netter (IL)

(73) Assignee: ROOTS SUSTAINABLE AGRICULTURAL TECHNOLOGIES LTD.

(*) Notice: Subject to any disclaimer, the term of this patent is extended or adjusted under 35 U.S.C. 154(b) by 34 days.

(21) Appl. No.: 15/301,236

(22) PCT Filed: Apr. 2, 2015

(86) PCT No.: PCT/IL2015/050359
§ 371 (c)(1),
(2) Date: Sep. 30, 2016

(87) PCT Pub. No.: WO2015/155763
PCT Pub. Date: Oct. 15, 2015

(65) Prior Publication Data
US 2017/0013790 A1  Jan. 19, 2017

Related U.S. Application Data

(60) Provisional application No. 61/977,304, filed on Apr. 9, 2014.

(51) Int. Cl.
*A01G 9/24* (2006.01)
*A01K 63/06* (2006.01)
(Continued)

(52) U.S. Cl.
CPC ............. *A01G 9/245* (2013.01); *A01B 79/00* (2013.01); *A01G 25/023* (2013.01); *A01G 29/00* (2013.01);
(Continued)

(58) Field of Classification Search
CPC ...... A01G 9/245; A01G 9/247; A01G 25/023; A01G 29/00; A01K 63/065; A01K 1/0158;
(Continued)

(56) References Cited

U.S. PATENT DOCUMENTS 585,856 A * 7/1897 Swanson ................ A01G 25/06
405/37
1,285,262 A * 11/1918 Loftus ..................... F24D 3/00
237/56
(Continued)

FOREIGN PATENT DOCUMENTS

CN 202043502 U 11/2011
EP 0295400 A1 * 12/1988 ........... A01G 25/023
(Continued)

OTHER PUBLICATIONS

"CN_202043502_U_H—Machine Translation.pdf", machine translation, EPO.org, Jul. 31, 2018.*
(Continued)

*Primary Examiner* — Steven B McAllister
*Assistant Examiner* — Daniel E. Namay
(74) *Attorney, Agent, or Firm* — Dorsey & Whitney LLP

(57) ABSTRACT

A heat delivery system for agricultural applications, the system including: piping including alternate heat insulated segments and heat transferring segments, the piping being configured with a fluid flow path extending through the alternating heat insulated segments and heat transferring segments; and a fluid propelling arrangement configured for
(Continued)

motivating flow of heat accommodating fluid within the fluid flow path.

15 Claims, 11 Drawing Sheets

(51) Int. Cl.
    *A01B 79/00*     (2006.01)
    *A01G 25/02*     (2006.01)
    *A01G 29/00*     (2006.01)
    *A01K 1/015*     (2006.01)

(52) U.S. Cl.
    CPC .......... *A01K 1/0158* (2013.01); *A01K 63/065* (2013.01); *F24D 2200/11* (2013.01); *Y02A 40/25* (2018.01); *Y02B 10/40* (2013.01)

(58) Field of Classification Search
    CPC .... A01K 41/026; A01K 61/17; F24D 2200/11
    USPC .............................. 237/16, 15, 63, 59, 19, 4
    See application file for complete search history.

(56) References Cited

U.S. PATENT DOCUMENTS

| | | | | |
|---|---|---|---|---|
| 2,107,933 A * | 2/1938 | Crockett | ................ | F24D 3/02 237/1 R |
| 2,247,972 A * | 7/1941 | Sullivan | ................ | F16L 41/02 138/37 |
| 2,376,412 A * | 5/1945 | James | ................ | F24D 19/0004 237/59 |
| 2,852,235 A * | 9/1958 | McElgin | ................ | F24D 3/00 165/55 |
| 3,556,297 A * | 1/1971 | Harrington | ........ | B01D 17/0205 210/767 |
| 3,610,523 A * | 10/1971 | Troy | ................ | B24C 7/00 237/8 R |
| 3,782,132 A * | 1/1974 | Lohoff | ................ | F24F 5/0003 62/260 |
| 3,899,136 A * | 8/1975 | Harmony | ............. | A01G 25/023 239/533.13 |
| 4,138,995 A * | 2/1979 | Yuan | ................ | F28D 15/0233 126/620 |
| 4,325,228 A * | 4/1982 | Wolf | ................ | F24J 3/086 165/142 |
| 4,401,261 A * | 8/1983 | Brown | ................ | F28D 21/0007 122/20 B |
| 4,437,236 A | 3/1984 | Oswald, Jr. | | |
| 4,437,263 A | 3/1984 | Nir et al. | | |
| 4,470,542 A * | 9/1984 | Pierce | ................ | F24B 1/187 126/502 |
| 4,516,629 A * | 5/1985 | Bingham | ................ | F25B 30/06 165/45 |
| 4,570,452 A * | 2/1986 | Bingham | ................ | F25B 30/06 62/260 |
| 4,601,426 A * | 7/1986 | Brosenius | ............ | F24D 11/002 237/56 |
| 5,007,583 A * | 4/1991 | Schwarz | ................ | F24D 3/1008 237/59 |
| 5,119,988 A * | 6/1992 | Fiedrich | ................ | G05D 23/126 237/59 |
| 5,133,151 A * | 7/1992 | Blok | ................ | A01G 31/02 47/64 |
| 5,289,797 A * | 3/1994 | Steudler, Jr. | ....... | A01K 39/0213 119/72 |
| 5,522,970 A * | 6/1996 | Shimizu | ................ | B01D 61/364 202/197 |
| 5,938,372 A * | 8/1999 | Lichfield | ................ | A01G 25/06 405/36 |
| 6,148,559 A * | 11/2000 | May | ................ | A01G 7/06 47/1.01 F |
| 6,283,382 B1 * | 9/2001 | Fitzemeyer | ............ | F24D 3/141 165/49 |
| 6,464,865 B2 * | 10/2002 | Tipton | ................ | C02F 3/046 210/170.08 |
| 6,589,111 B1 * | 7/2003 | Giroux | ................ | F24F 7/06 219/201 |
| 2003/0168518 A1 * | 9/2003 | Beida | ................ | E21B 36/005 237/80 |
| 2003/0177695 A1 * | 9/2003 | Manning | ................ | A01G 25/02 47/48.5 |
| 2004/0099002 A1 * | 5/2004 | Michelbach | .......... | F24F 1/0007 62/314 |
| 2004/0221982 A1 * | 11/2004 | Zaimis | ................ | F24D 17/001 165/47 |
| 2005/0077396 A1 * | 4/2005 | Rabinowitz | .......... | A01G 25/023 239/542 |
| 2005/0258278 A1 * | 11/2005 | Cohen | ................ | A01G 25/023 239/542 |
| 2005/0284966 A1 * | 12/2005 | DeFrank | ............. | A01G 25/023 239/542 |
| 2006/0021278 A1 * | 2/2006 | McCardle | ............. | A01G 9/247 47/39 |
| 2006/0059928 A1 * | 3/2006 | Fujiyoshi | ................ | F24F 11/30 62/176.6 |
| 2006/0242983 A1 * | 11/2006 | Spadafora | ............... | F25B 30/06 62/260 |
| 2007/0155303 A1 * | 7/2007 | Choi | ................ | F24F 13/20 454/258 |
| 2007/0295829 A1 * | 12/2007 | Yang | ................ | F24D 11/00 237/80 |
| 2008/0028761 A1 * | 2/2008 | Yang | ................ | F24F 5/0046 60/641.6 |
| 2008/0041978 A1 * | 2/2008 | Keren | ................ | A01G 25/02 239/542 |
| 2008/0105755 A1 * | 5/2008 | Richings | ................ | F24D 12/02 237/81 |
| 2009/0320477 A1 * | 12/2009 | Juchymenko | ......... | F01K 23/065 60/651 |
| 2011/0017449 A1 * | 1/2011 | Berruti | ................ | E21B 36/025 166/272.3 |
| 2011/0058900 A1 * | 3/2011 | Furukawa | .............. | A01G 25/06 405/43 |
| 2011/0088315 A1 * | 4/2011 | Donoghue | ............. | A01G 25/16 47/48.5 |
| 2011/0100357 A1 | 5/2011 | Wagener | | |
| 2013/0333383 A1 * | 12/2013 | Schwarck | ............... | F24T 10/17 60/641.2 |
| 2014/0021273 A1 * | 1/2014 | Turk | ................ | A01G 25/02 239/542 |
| 2014/0026568 A1 * | 1/2014 | Peele | ................ | F24T 10/10 60/641.2 |
| 2014/0138455 A1 * | 5/2014 | Herrera | ................ | A01G 25/023 239/11 |
| 2015/0115047 A1 * | 4/2015 | Okamoto | ........... | G05D 23/1917 236/1 E |
| 2018/0116132 A1 * | 5/2018 | Palmer | ............... | A01G 13/0231 |

FOREIGN PATENT DOCUMENTS

| | | | | |
|---|---|---|---|---|
| EP | 0444425 A1 * | 9/1991 | .......... | A01G 25/023 |
| FR | 2229347 A1 * | 12/1974 | .......... | A01G 25/023 |
| FR | 2365375 A1 * | 4/1978 | .......... | A01G 25/023 |
| FR | 2561064 A1 * | 9/1985 | .......... | A01G 25/167 |
| JP | 03201976 A * | 9/1991 | | |
| JP | 2013172707 A | 9/2013 | | |
| WO | WO-2007068523 A1 * | 6/2007 | .......... | A01G 25/023 |
| WO | WO-2007116389 A1 * | 10/2007 | .......... | A01G 25/023 |
| WO | WO-2013148556 A1 * | 3/2013 | ............ | B29C 48/09 |

OTHER PUBLICATIONS

"JP_2013172707_A_M—Machine Translation.pdf", machine translation, JPO, dated Aug. 1, 2018.*

"Definition Monolithic—Dictionary.com.pdf", dictionary.com, Feb. 14, 2019.*

"Handbook of Air Conditioning and Refrigeration, Second Ed.", Wang, Shan K., McGraw-Hill, p. 7-15, 2001.*

(56) References Cited

OTHER PUBLICATIONS

International Preliminary Report on Patentability and Written Opinion of the International Searching Authority PCT/IL2015/050359 dated Oct. 12, 2016.
International Search Report and Written Opinion issued in a corresponding application PCT/IL2015/050359 dated Aug. 27, 2015.

* cited by examiner

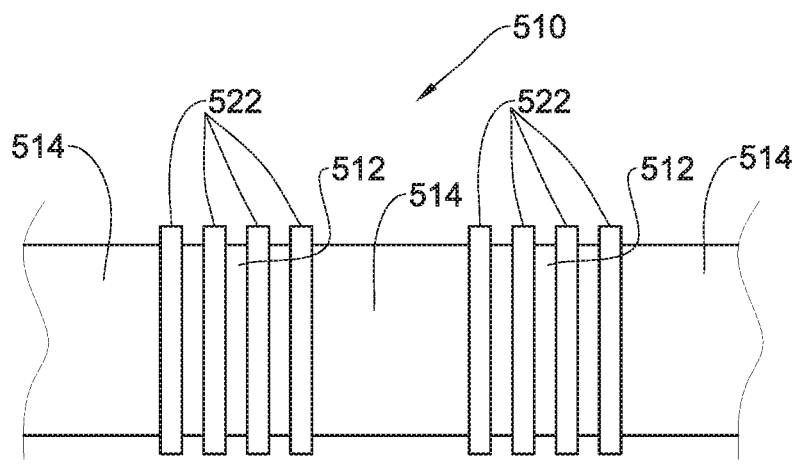
Fig. 2A
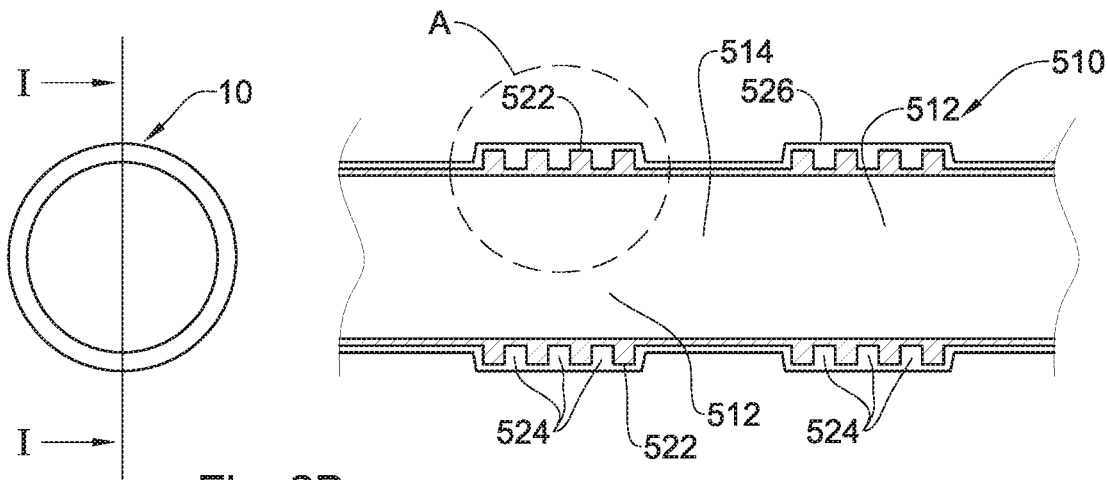
Fig. 2B
Fig. 2C
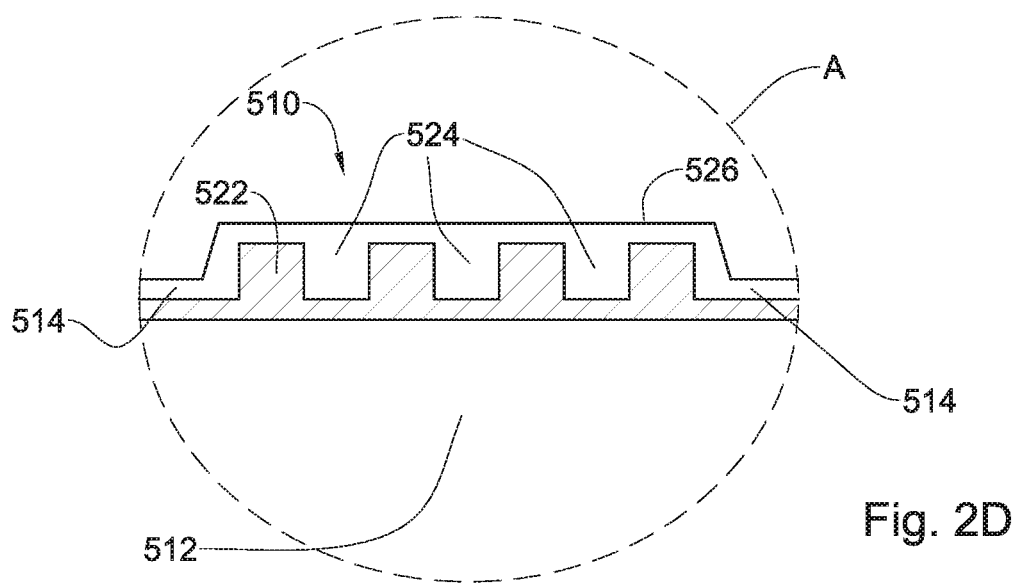
Fig. 2D

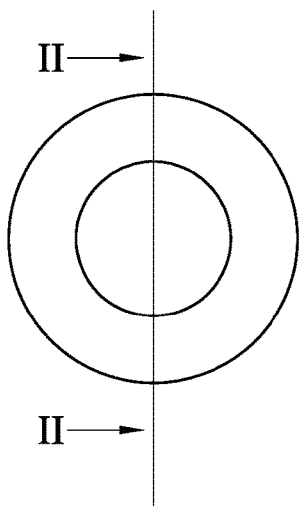
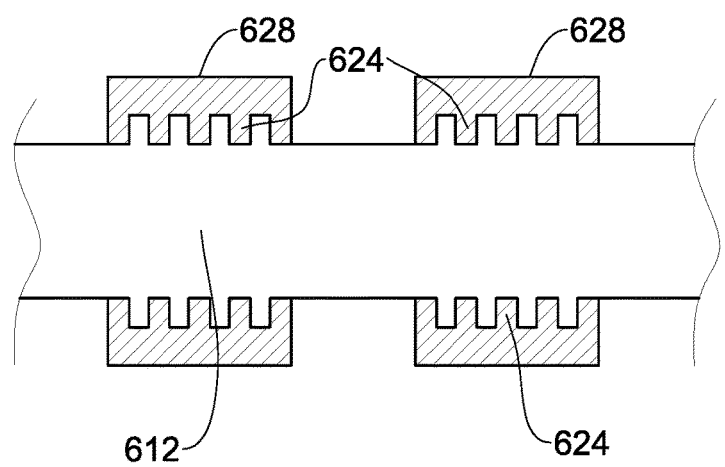
Fig. 2E          Fig. 2F
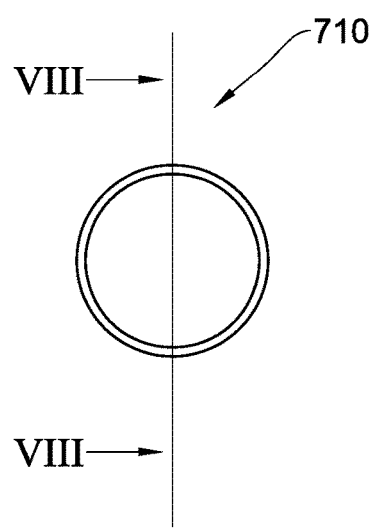
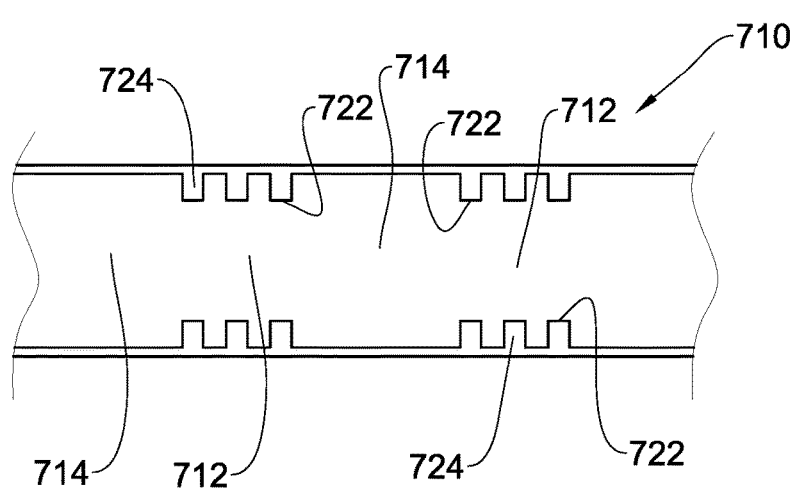
Fig. 2G          Fig. 2H

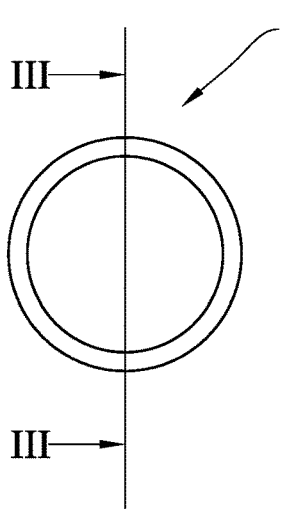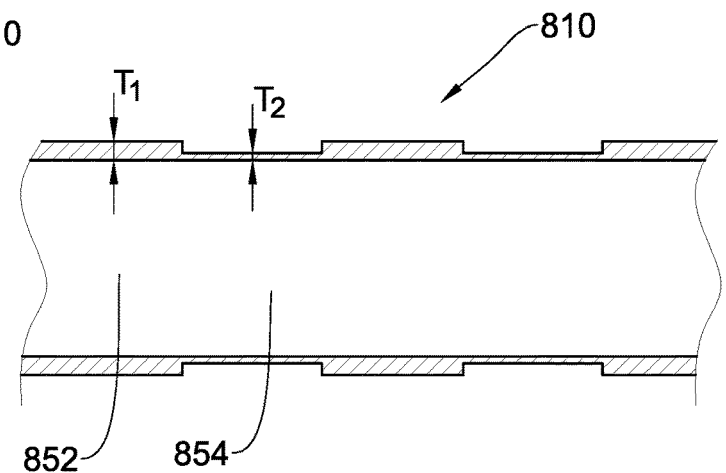
Fig. 3A                    Fig. 3B
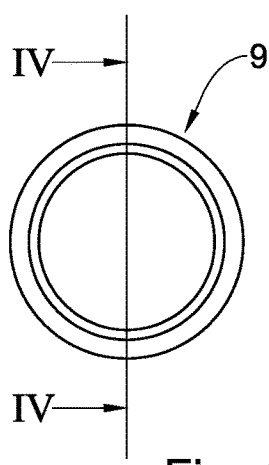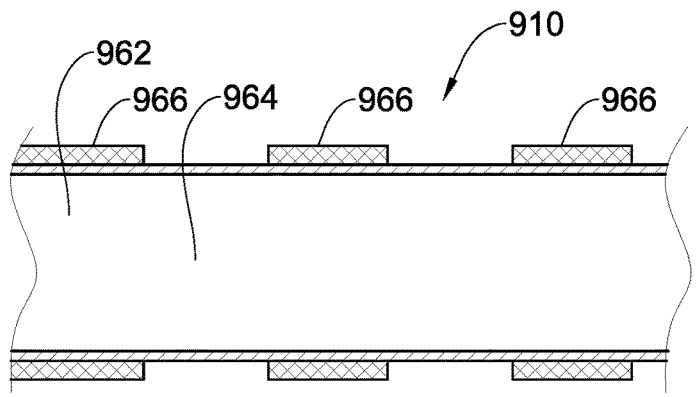
Fig. 4A                    Fig. 4B
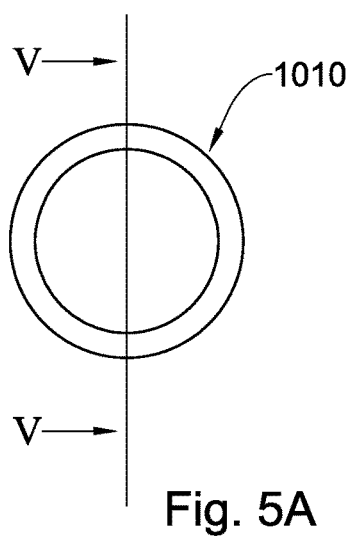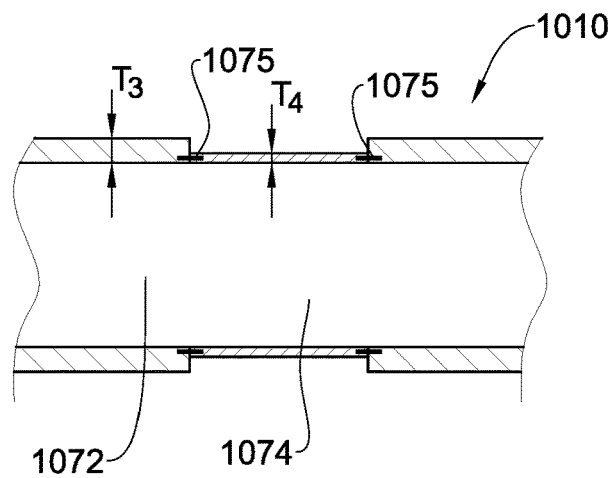
Fig. 5A                    Fig. 5B

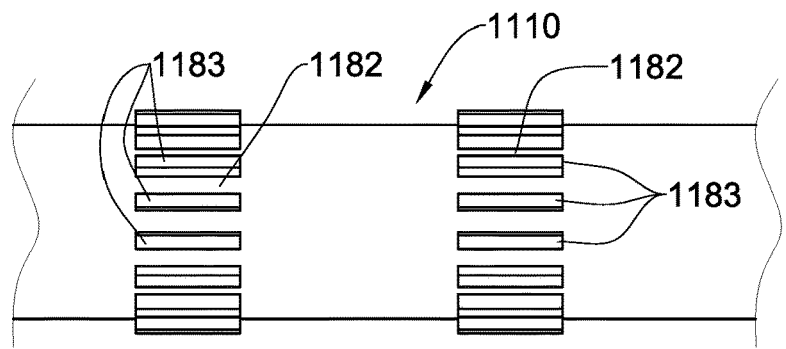
Fig. 6A
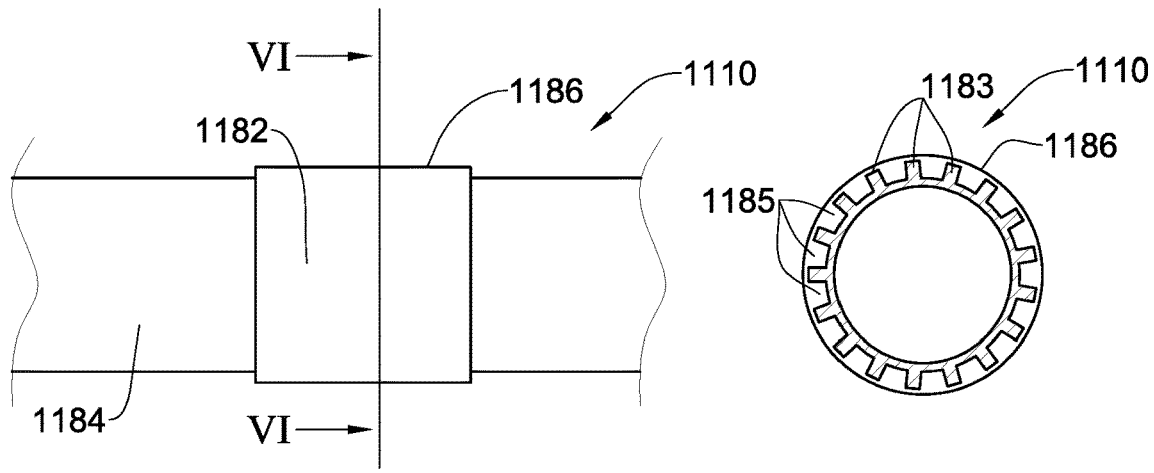
Fig. 6B
Fig. 6C
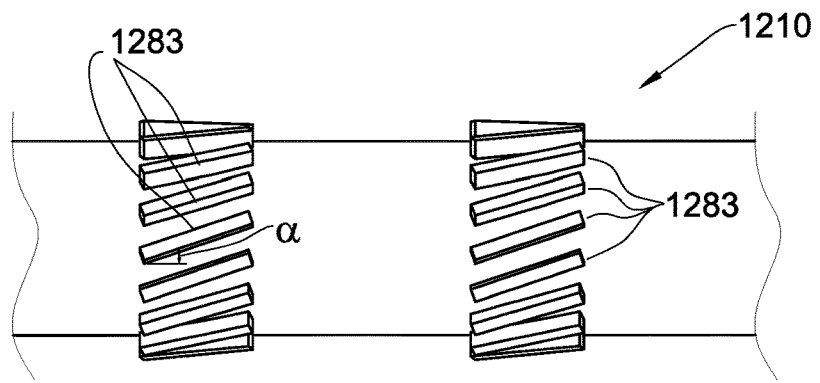
Fig. 6D

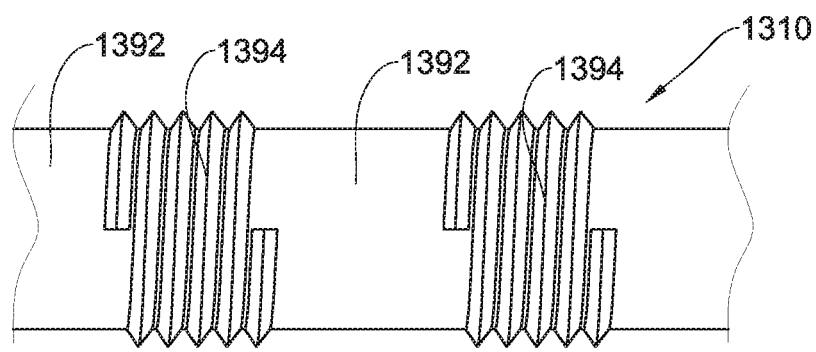
Fig. 7A
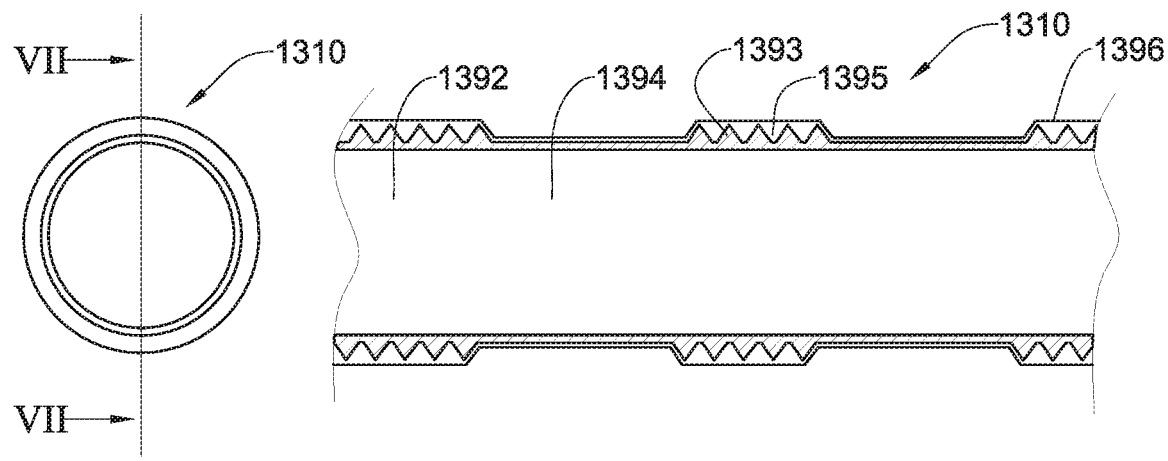
Fig. 7B
Fig. 7C
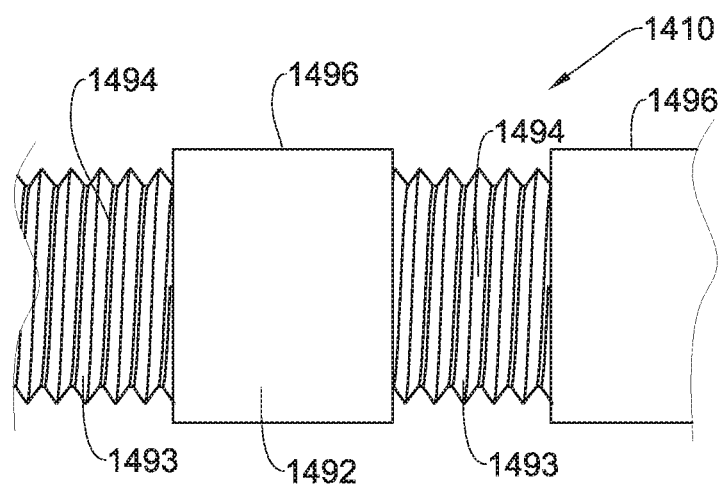
Fig. 7D

HEAT DELIVERY SYSTEM AND METHOD

CROSS-REFERENCE TO RELATED APPLICATIONS

The present application is a U.S. National Phase of PCT/IL2015/050359 on Apr. 2, 2015 claiming priority to U.S. provisional application No. 61/977,304 filed Apr. 9, 2014; the disclosure of the PCT Application is hereby incorporated by reference into the present Application.

TECHNOLOGICAL FIELD

The present disclosure is concerned with a method of heat delivery and a system for carrying out same.

BACKGROUND

Five percent of the covered global agricultural market is currently using some kind of climate optimization method, mostly air heating. The other ninety five percent is not, largely due to extensive initial investment, high monthly energy utility bills and large environmental footprint. Traditional climate control methods are sub-optimal due to several combined factors: The need for two completely separate, air-based heating and cooling systems, high energy costs, heavy environmental impact and slow ROI.

Root zone heating is an effective technique in agriculture (e.g., greenhouses) that provides heat directly to the growing media rather than heating the air. This technique can provide the following benefit for growers: faster production, improved quality crops and energy savings and low environmental footprint. Root zone heating influences all parameters of the plant's physiology, growth, productivity and quality. In addition, significant energy savings could be achieved. For example, if the root zone temperature is maintained at the optimum, air temperature in a greenhouse can be lowered 5° C. to 10° C., thereby reducing energy consumption and expense for the farmers. This is possible because root zone temperature is more critical than leaf temperature for achieving good plant growth.

One possible system for root zone heating is a direct ground source heat exchanger that transfers heat from a ground source exchanger to heat or cool consumers.

GENERAL DESCRIPTION

According to a first aspect of the presently disclosed subject matter there is disclosed a heat delivery system for agricultural applications, the system is configured with piping having alternate heat insulated segments and heat transferring segments.

The heat delivery system is configured for fluid flow through the piping for delivering heat accommodated therewith, through sidewalls of the heat transferring segments of the piping to surroundings thereof. The piping is configured with a fluid flow path extending through the alternating heat insulated segments and heat transferring segments.

The heat delivery system is configured for use in conjunction with a plurality of heat consumers, so as to deliver heat thereto. According to one example, each heat transferring segment is configured for being disposed in proximity to one or more heat consumers (e.g., plants in a greenhouse). According to another example, each heat consumer is configured for being disposed in proximity to one or more heat transferring segment.

The heat transferring segments are disposed along the piping according to a predetermined arrangement, so that the location of each heat transferring segment is corresponding to the location of a respective heat consumer in proximity to which the heat transferring segment is to be disposed.

According to a specific example, the heat consumers can be roots of one or more plants. According to other specific examples, the heat consumers can be one or more of the following: fish growing in a pool, portions of floors of animal husbandry, etc.

Hereinafter in the specification and claims the phrases heat insulated segments and heat transferring segments refer to segments of the piping, so that the heat transferring segments are characterized by sidewalls with higher heat transfer coefficient when compared with the sidewalls of the heat insulated segments. The segments can have a longitudinal shape.

The term agriculture refers to the science, art, or practice of cultivating the soil, producing crops, and raising livestock and in varying degrees the preparation and marketing of the resulting products. The term agriculture further refers to aquaculture and animal husbandry.

The term heat refers to energy which spontaneously transfers from a hotter body to a colder one, and can have a positive or a negative value. A positive value is configured for raising the temperature of the colder body (i.e., heating), and a negative value is configured from lowering the temperature of the hotter body (i.e., cooling).

The term fluid refers to liquid (e.g., water) or gas. The fluid can be characterized by a high heat capacity.

The term piping refers to one or more pipes, conduits or any other closed fluid lines configured for facilitating fluid flow therein.

The term sidewall refers to one or more layers forming the piping, and separates between an internal surface of the piping, defining the flow path through which the fluid flows, and an external surface of the piping.

The term soil refers to the portion of the earth's surface consisting of disintegrated rock and/or growing media used to grow plants, and is interchangeable with the term ground.

According to a second aspect of the presently disclosed subject matter there is provided a method for heat delivery, for agricultural applications, the method comprising the steps of:

a. providing a heat delivery system, configured with piping having alternate heat insulated segments and heat transferring segments;

b. propelling flow of a heat accommodating fluid within the piping, thereby delivering the heat accommodated therewith, through sidewalls of the heat transferring segments of the piping to surroundings thereof.

The method can comprise a further step of disposing the heat transferring segments in proximity to one or more heat consumers, so as to provide heat thereto. Alternatively, the method can comprise a step of disposing the heat consumers in proximity to their respective heat transferring segments.

According to a third aspect of the presently disclosed subject matter there is disclosed a method for manufacturing a heat delivery system for agricultural applications, configured for delivering heat to a plurality of heat consumers, the method comprising at least the step of providing piping with alternate heat insulated segments and heat transferring segments along the piping, the piping is configured with a fluid flow path extending through the alternating heat insulated segments and heat transferring segments.

With reference to the third aspect, the method can comprise the step of forming one or more lateral protrusions on one or both of the internal and the external surfaces of the sidewalls of the heat insulated segments, and a further step of applying a sleeve at least over the heat insulated segments, thereby forming one or more heat insulating cavities between the lateral protrusions and the sleeve.

The arrangement of alternate heat insulated segments and heat transferring segments allows optimizing heat delivery to heat consumers. The heat charged to the fluid flowing through the piping by the heat source is delivered to the heat consumers through the heat transferring segments, while delivery of heat to areas not occupied by heat consumers is decreased at the heat insulated segments. Such an optimization of heat delivery to the heat consumers allows decreasing the heat input from the heat source, thereby economizing energy.

The heat delivered to the heat consumers can be of a positive value, i.e. the fluid delivers energy to the heat consumers, and a negative value, i.e. the heat consumer delivers energy to the fluid. The heat delivery system can thus be used for cooling or heating the heat consumers so as to maintain a substantially stable temperature thereof.

The heat delivery system can be applied in an agricultural field for growing plants, and configured for delivering heat to heat consumers, i.e., roots of the plants. The agricultural field can be covered (e.g., a greenhouse) or uncovered. The heat delivery system can influence the temperature of the root zone (i.e., the growing media or the soil that is the surrounding the roots) and facilitate control of the temperature of the soil accommodating the roots. The heat delivery system can function for cooling or heating of the soil accommodating the roots so as to maintain substantially a permanent temperature thereof. A permanent and more stable temperature of the soil accommodating the roots, or at least moderate changes of temperature along the day, the night and seasons of the year, can improve the growth of the plants.

The heat delivery system can be further applied in aquaculture for raising fish in pools including water. The heat delivery system can be used for delivering heat to water, and thereby influencing on the temperature of the water. The heat delivery system can function for cooling or heating of the water within the pools so as to maintain a substantially permanent temperature thereof. A permanent and more stable temperature of the water, or at least moderate changes of the water's temperature can improve the growth of fish within said water.

Any one or more of the features, designs and configurations below can be incorporated in the heat delivery system and methods according to the presently disclosed subject matter, independently or in various combinations thereof.

At least the sidewalls of the heat insulated segments can be configured with one or more lateral protrusions, projecting from one of the internal and the external surfaces of the sidewall. The one or more lateral protrusions are configured for forming one or more heat insulating cavities, when a sleeve is applied thereover, between the lateral protrusions and the sleeve.

The sleeve can be a heat insulating sheath that is applied or fixed over one of the internal and/or the external surfaces of the sidewall of the heat insulated segments, e.g. by gluing, heat welding, heat shrinking, etc. so as to increase the insulation thereby.

The sleeve can be an inner sleeve, covering the internal surface of the sidewall of the piping, and/or an outer sleeve, covering the external surface of the sidewall of the piping.

The sleeve can be segmented and cover the heat insulated segments exclusively. According to a specific example related to this aspect, the ends of the segments of the sleeve, covering a respective heat insulated segment, can be attached at a heat insulated fashion to the piping, so as to prevent heat loss from the ends of the sleeve segment.

The one or more heat insulating cavities can contain thermally insulating material. According to a specific example, the insulating material is air, and according to other examples the heat insulating material is foamed material.

The one or more lateral protrusions can be insulating material in the form of ring-shaped protrusions.

The one or more lateral protrusions can be helical, extending at least along the heat insulated segments.

The one or more lateral protrusions can be substantially linear. According to a specific example, the lateral protrusions can extend along the heat insulated segments.

The sidewall of the piping can be configured with different wall thicknesses, so that the wall thickness at the heat insulated segments is greater than the wall thickness at the heat transferring segments.

The heat insulated segments and heat transferring segments can be separate segments, configured to be assembled together, in an alternate order, so as to form the piping.

The heat insulated segments and heat transferring segments can be disassembled and\or assembled together when manufactured or when applying the system on site.

According to one example related to this aspect, the heat insulated segments and heat transferring segments can be made from different materials, characterized by a different heat transfer coefficient.

The piping can be buried in an agricultural soil or laid on top of the soil.

The heat consumers can be roots of plants.

The heat insulated segments and the heat transferring segments can be of uniform or altering length.

Recognizable Indicia can be associated at least with the heat transferring segments. Such indicia can be visible indicia such as marking over the external surface of the piping, or there can be provided detectable indicia such as an RF transmitter embedded within the piping, etc.

The heat delivery system can further comprise a fluid emitting system comprising at least one emitting pipe configured with a plurality of emitters configured for emitting fluid (e.g., water) at surroundings of the pipe. The emitters can be drip irrigation emitters or spray emitters.

The emitters can be disposed in proximity to the heat transferring segments.

The emitted fluid can serve for irrigation, fertilization, and pesticiding the consumers.

The piping and the emitting pipe can constitute the same piping in which said emitters are disposed at the heat transferring segments for emitting the heat accommodating fluid to surroundings of the piping, and in particular, to the heat consumers.

The emitters can be selectively activated emitters. According to a specific example, the activation of the selectively activated emitters can depend on the pressure within the emitting pipe, i.e., the selectively activated emitters can be turned on and turned off to provide different predetermined desired quantities and/or spatial distributions of fluid by controlling inlet water pressure to the emitting pipe. The selectively activated emitters can be activated depending on other variables of the fluid, such as temperature and flow rate, or depending on time intervals.

The activation of the emitters can be remotely controlled, e.g. by a programmed controller, timer or human operator.

The piping can extend adjacently to heat consumers within or over soil, or at any agricultural media, so as to deliver heat to heat consumers disposed therein.

The heat consumers can be portions of a plant disposed upon an agricultural surface, e.g. its fruits, stem or flowers.

The piping can be made for example of any of the following materials: plastic, ceramic, fiberglass, polymers such as polyethylene and polypropylene, organic and inorganic materials, bio-degradable materials, metallic materials, such as: aluminum, copper, steel, iron, etc.

The heat delivery system can be configured for controlling the temperature, and optionally moisture, of portions of a plant, such as the soil accommodating its roots, the stem, fruits or flowers thereof.

The heat delivery system can comprise a fluid propelling arrangement configured for motivating flow of the heat accommodating fluid within the piping. According to one example, the fluid propelling arrangement can be a pump. The pump can be a heat pump, a hydro pump, a gravitational pool, or a natural fluid source such as a river.

The system can comprise a heat source configured for delivering heat to the fluid.

The heat source can be a conventional source (e.g. operated by electricity, fossil fuels, gas, coal, burning woodchips, etc.), an alternative source (geothermal heat source, solar, wind, biomass, hydropower, etc.) or any kind of heat source which is capable of delivering heat to the fluid.

The heat source can be any mechanical heat source, such as heat pump, water boiler, chiller, electric heat source, gas operated heat source, etc.

The heat source can be a natural heat source, such as ground source heat exchanger, solar, underwater reservoir (e.g., aquifer or well), surface reservoir such as a lake or a river stream, atmospheric air, and the like.

Some or all of the heat insulated segments and the heat transferring segments can be equidistantly disposed.

The heat insulated segments can be displaceable along the piping, so as to change their location there along.

The heat insulated segments and the heat transferring segments can be characterized by different geometry, e.g. diameter and length, for each segment.

The heat delivery system can be a closed loop system, i.e. the fluid can be repeatedly re-charged with heat and deliver the heat to the heat consumers, while continuously flowing within the loop. The closed loop configuration can be used in conjunction with a natural heat source, such as an aquifer, for using the natural fluid of the aquifer without affecting the level of the aquifer.

The heat delivery system can be an open loop system, i.e. the fluid can be discharged from the piping during or after delivering the heat therefrom. According to a specific example, the open loop system can include the emitters.

The heat delivery system can be used in conjunction with a greenhouse, and deliver heat to portions thereof so as to control their temperature.

The piping can be formed by extrusion.

At least the heat insulated segments can be formed with one or more lateral protrusions, projecting from one of the internal and the external surfaces of the sidewall.

The piping can be formed by double sided extrusion mold, intermittently extruding the piping exclusively of one side, and the piping with one or more layers on the other.

The one or more layers can be extruded with the piping, so as to form heat insulating cavities between the one or more layers and the one or more lateral protrusions.

The one or more layers can be extruded independently, and can be added to the piping, so as to cover at least the heat insulated segments.

The one or more layers can be added to the piping, so as to form heat insulating cavities between the one or more layers and the one or more lateral protrusions.

The one or more layers can be added to the piping by threading.

The one or more layers can be added to the piping by heat welding or heat shrinking.

The one or more layers can be a single sleeve, configured for covering the piping along its length, and cover both the heat insulated segments and the heat transferring segments.

The one or more layers can be added to the piping, at least at the heat insulated segments, in such a manner that an insulating material is contained between the piping and the one or more layers.

An insulating sheath can be fixed to the piping, at least at the heat insulated segments, so as to increase the insulation thereby. The fixing can be obtained by gluing, heat welding, heat shrinking, etc.

The heat insulated segments and the heat transferring segments can be formed separately, and to be assembled together, in an alternate order, so as to form continuous piping.

The piping can be formed by injection molding technology.

According to a further aspect of the presently disclosed subject matter, there is provided a ground source heat delivery system comprising:

at least one first piping configured to be buried within a soil, facilitating flow of a heat accommodating fluid therein and transferring heat from the soil thereto through sidewalls of the first piping;

at least one second piping in fluid communication with the first piping for facilitating flow of said heat accommodating fluid therethrough and transferring heat of said heat accommodating fluid to at least one heat consumer through sidewalls of the second piping;

a fluid pump in fluid communication with said first piping and said second piping, configured for propelling said heat accommodating fluid; and a fluid emitting system comprising at least one emitting pipe configured to be buried within said soil and to extend at least partially along said first piping, said emitting pipe being configured with a plurality of emitters configured for emitting fluid at the soil surrounding the first piping.

In operation, the fluid emitted from the emitters is wetting the soil surrounding the first piping so as to increase heat conductivity of the soil and to improve heat transfer from the soil to the first piping, and in particular to the heat accommodating fluid flowing therein. It is known that heat conductivity of soil depends on the type of the soil and on its wetness. Although the type of the soil in uncontrollable, the wetness of the soil can be changed by wetting the soil in a controlled manner, as performed by the system of the presently disclosed subject matter. This allows improving the heat conductivity of the soil and improving transfer of heat from the soil to the heat accommodating fluid.

For example, when the first piping is buried at a depth of more than 2 meters, it is known that the temperature of the soil surrounding the first piping is always warmer in the winter and colder in the summer than the temperature of the soil that surrounds the second piping. By wetting the soil surrounding the first piping, as performed by the fluid emitting system, more heat of that soil can be transferred to the heat accommodating fluid.

The heat consumer that receives heat from the second piping can be an agricultural consumer such as roots of a plant, and it can also be a non-agricultural consumer such as a commercial or a domestic building or any other structure which would use the heat for cooling and/or heating purposes.

The ground source heat delivery system can further comprise a fluid source in fluid communication with the first piping and the second piping, for supplying said heat accommodating fluid thereto.

The emitters can be drip irrigation emitters or spraying emitters.

The ground source heat delivery system can further comprise a heat source configured for delivering heat to the heat accommodating fluid. The heat source can be a conventional source (e.g. operated by electricity, fossil fuels, gas, coal, burning woodchips, etc.), an alternative source (geothermal heat source, solar, wind, biomass, hydropower, etc.) or any kind of heat source which is capable of delivering heat to the fluid. The heat source can be any mechanical heat source, such as heat pump, water boiler, chiller, electric heat source, gas operated heat source, etc.

The second piping can have alternate heat insulated segments and heat transferring segments. The arrangement of alternate heat insulated segments and heat transferring segments can allow optimizing heat delivery to heat consumers. The heat charged to the fluid flowing through the second piping by the heat source is delivered to the heat consumers through the heat transferring segments, while delivery of heat to areas not occupied by heat consumers is decreased at the heat insulated segments. Such an optimization of heat delivery to the heat consumers allows decreasing the heat input from the heat source, thereby economizing energy.

A sidewall of the second piping can be configured with different wall thicknesses, so that the wall thickness at the heat insulated segments is greater than the wall thickness at the heat transferring segments.

The first piping, the second piping and the fluid pump can constitute elements of a closed loop system.

The fluid emitting system can be an open loop system.

The emitters can be selectively activated emitters the activation of which depends on the pressure within the emitting pipe.

The first piping can be disposed in the system below the second piping.

According to a further aspect of the presently disclosed subject matter, there is provided a method for heat delivery comprising the steps of:

a. providing a ground source heat delivery system, comprising: at least one first piping configured for facilitating flow of a heat accommodating fluid; at least one second piping in fluid communication with the first piping for facilitating flow of said heat accommodating fluid therethrough; a fluid pump in fluid communication with said first piping and said second piping; and a fluid emitting system comprising at least one emitting pipe extending at least partially along said first piping and configured with a plurality of emitters;

b. propelling said heat accommodating fluid by said fluid pump between said second piping and said first piping;

c. transferring heat from the soil to the heat accommodating fluid through sidewalls of the first piping;

d. transferring heat from the heat accommodating fluid to at least one heat consumer through sidewalls of the second piping; and e. emitting fluid by said emitters at surroundings of the first piping, and thereby wetting the soil and increasing heat conductivity thereof.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 2A is a side view of a portion of a pipe according to a first example of the presently disclosed subject matter;

FIG. 2B is an end view of the pipe of FIG. 2A, covered by a sleeve;

FIG. 2C is a cross-sectional view taken along the line I-I in FIG. 2B;

FIG. 2D is an enlarged view of the portion A in FIG. 2C;

FIG. 2E is an end view of a pipe similar to that illustrated in FIG. 2A, however with a solid insulating material attached thereto;

FIG. 2F is a cross-sectional view taken along the line II-II in FIG. 2E;

FIG. 2G is a front view of a pipe according to yet an example of the presently disclosed subject matter, having inwardly projecting lateral protrusions;

FIG. 2H is a cross-sectional view taken along the line VIII-VIII in FIG. 2G;

FIG. 3A is an end view of a pipe according to another example of the presently disclosed subject matter;

FIG. 3B is a cross-sectional view taken along line in FIG. 3A;

FIG. 4A is an end view of a pipe according to still another example of the presently disclosed subject matter;

FIG. 4B is a cross-sectional view taken along line IV-IV in FIG. 4A;

FIG. 5A is an end view of a pipe according to still an example of the presently disclosed subject matter;

FIG. 5B is a cross-sectional view taken along line V-V in FIG. 5A;

FIG. 6A is a side view of a portion of a pipe according to another example of the presently disclosed subject matter;

FIG. 6B is a front view of the pipe of FIG. 6A, covered by a sleeve;

FIG. 6C is a cross-sectional view taken along line VI-VI in FIG. 6B;

FIG. 6D is a side view of another example of a pipe according to the presently disclosed subject matter;

FIG. 7A is a side view of a portion of a pipe according to another example of the presently disclosed subject matter;

FIG. 7B is an end view of the pipe of FIG. 7A, covered by a sleeve;

FIG. 7C is a cross-sectional view taken along line VII-VII in FIG. 7B;

FIG. 7D is a side view of another example of a pipe according to the presently disclosed subject matter;

DETAILED DESCRIPTION OF EMBODIMENTS

Figure 1A:
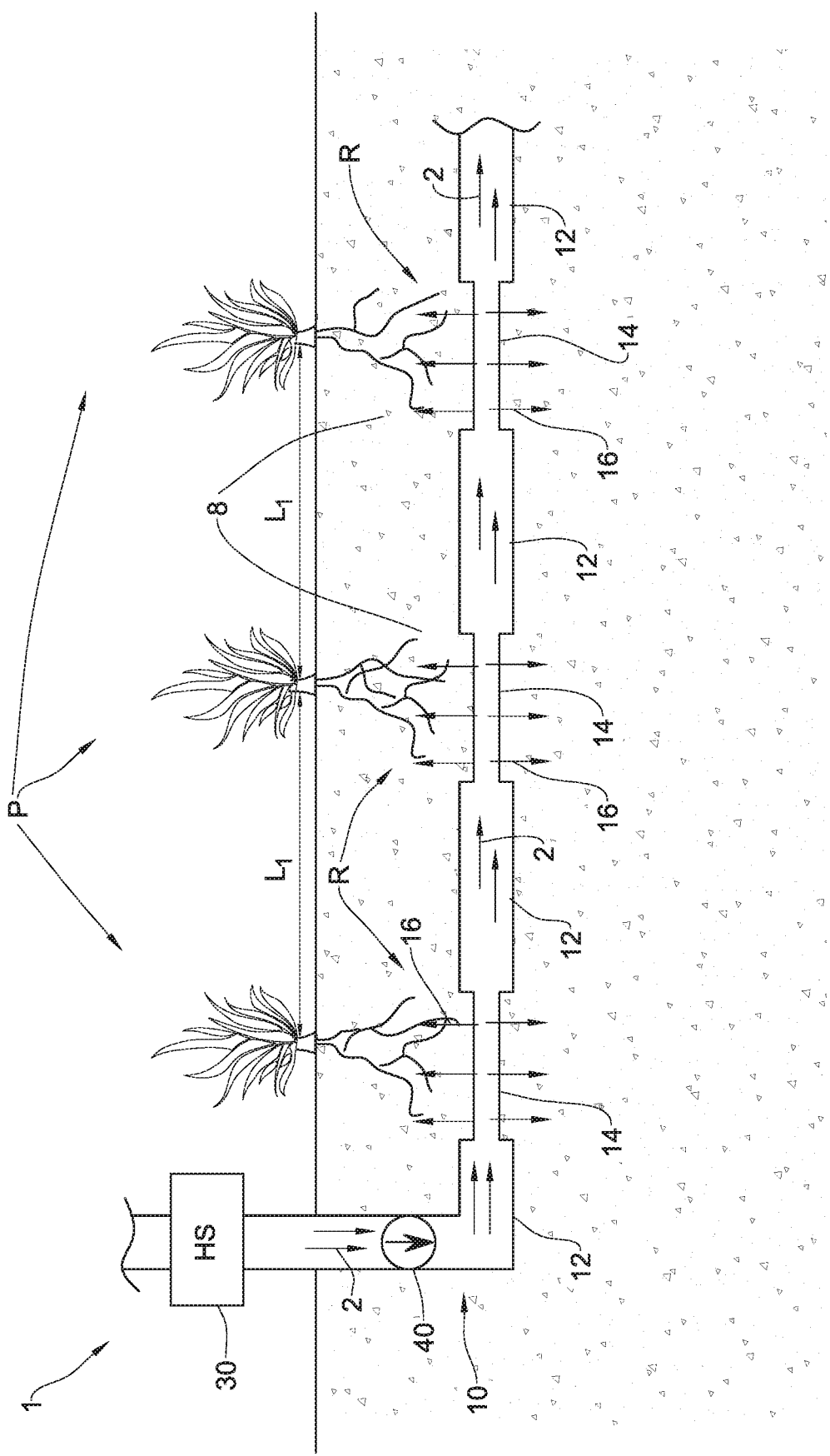
FIG. 1A is a schematic view of a heat delivery system according to a first example of the presently disclosed subject matter.

Attention is first directed to FIG. 1A of the drawings, illustrating a first example of a heat delivery system according to the present disclosure, generally designated 1. The heat delivery system 1 is applied in an agricultural field for growing plants P, and configured for delivering heat to heat consumers which according to the present example are the roots R of the plants P, growing in an agricultural soil 8. The heat delivery system 1 is configured for influencing root zone temperature (i.e., the temperature at the surrounding of the roots R) and facilitating control of the temperature of the soil 8 accommodating the roots R.

Influencing and controlling of the temperature of roots R of plants P is important, for example, in areas characterized by a significant temperature difference, e.g. warm climate during the daytime and cold climate during the nighttime. The heat delivery system 1 can function for both cooling or heating of the soil 8 (or any substrate or growing media or fluid) accommodating the roots R so as to maintain substantially permanent temperature thereof. Permanent and more stable temperature of the soil accommodating the roots R, or at least moderate changes of temperature along the day improves the growth of the plants P.

The heat delivery system 1 comprises piping in the form of a pipe 10, buried in the soil 8 at a depth of about 15 [cm], in proximity to the roots R. The pipe 10 is configured for facilitating flow therethrough of a fluid 2, for delivering heat accommodated within the fluid 2 to the soil 8 accommodating the roots R. According to other examples, the depth of the pipe can be between about 5 [cm] to about 30 [cm].

The fluid 2 is charged with heat by a heat source 30, and is motivated to flow within the pipe 10 by a propelling arrangement, namely a pump 40. The motivated fluid, with heat accommodated therewith flows through the pipe 10, and delivers the heat to the roots R along its flow in the pipe 10, however at selected portions of the pipe 10, as will be explained herein below. Arrows 16 refer to heat delivered from the fluid 2 to surroundings thereof.

The pipe 10 is configured with alternate heat insulated segments 12 and heat transferring segments 14. As will be detailed below, the heat insulated segments 12 are configured for decreasing heat exchange between the fluid 2 and surroundings of the pipe 10 to a minimum, while the heat transferring segments 14 are configured for increasing the heat exchange to a maximum. This kind of arrangement facilitates optimal use of the heat delivered to the fluid 2 from the heat exchanger 30, because it focuses the heat delivery to the heat consumers, i.e. to the soil accommodating the roots R on one hand, and prevents or limits heat delivery from the fluid to areas not occupied by heat consumers.

In order to deliver heat to the roots R, and to prevent heat delivery to areas where there are no roots R, the pipe 10 is configured in such a manner that each heat transferring segment 14 is disposed in proximity to the roots R of a respective plant P. In addition, the heat insulated segments 12 are disposed in proximity to areas not accommodating roots R, thereby decreasing heat delivery to these areas. Such a configuration is obtained by designing the pipe 10 so as to comply with a given agricultural field. In the illustrated example, the plants P are distanced from each other at a distance $L_1$. The pipe 10 is designed taking into consideration the characteristics of the field to which it was designated, and the heat transferring segments 14 were disposed therealong so as to comply with these characteristics, i.e. so as to deliver heat to roots of plants spaced at a distance of $L_1$. The heat transferring segments 14 are disposed along the pipe 10 with equal spacing therebetween so as to comply with equally spaced plants P, as shown in FIG. 1A. However, the heat transferring segments 14 can be unequally spaced from each other, so as to comply with unequally spaced plants P, as can be seen in FIG. 1D.

According to an example in which a heat delivery system is already placed in a site, the plants P can be planted in the site so as to comply with the given heat delivery system, i.e. the plants P can be disposed so that their roots R are in proximity with a given location of the heat transferring segments 14.

Figure 1B:
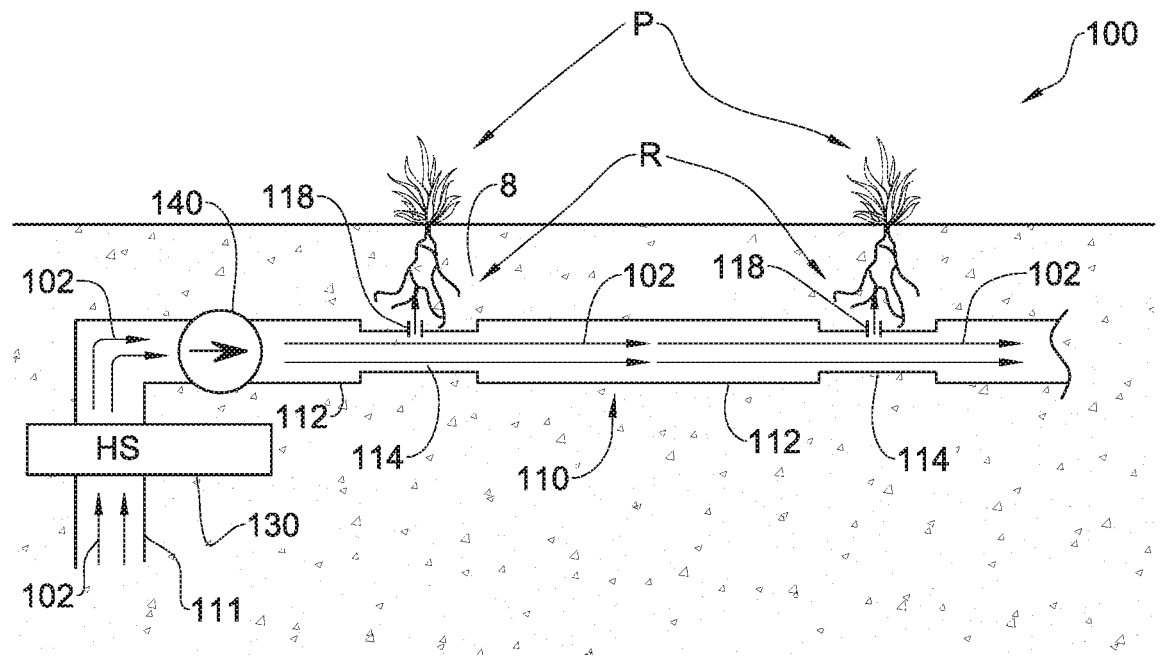
FIG. 1B is a schematic view of an open loop heat delivery system according to a second example of the presently disclosed subject matter.
Figure 1C:
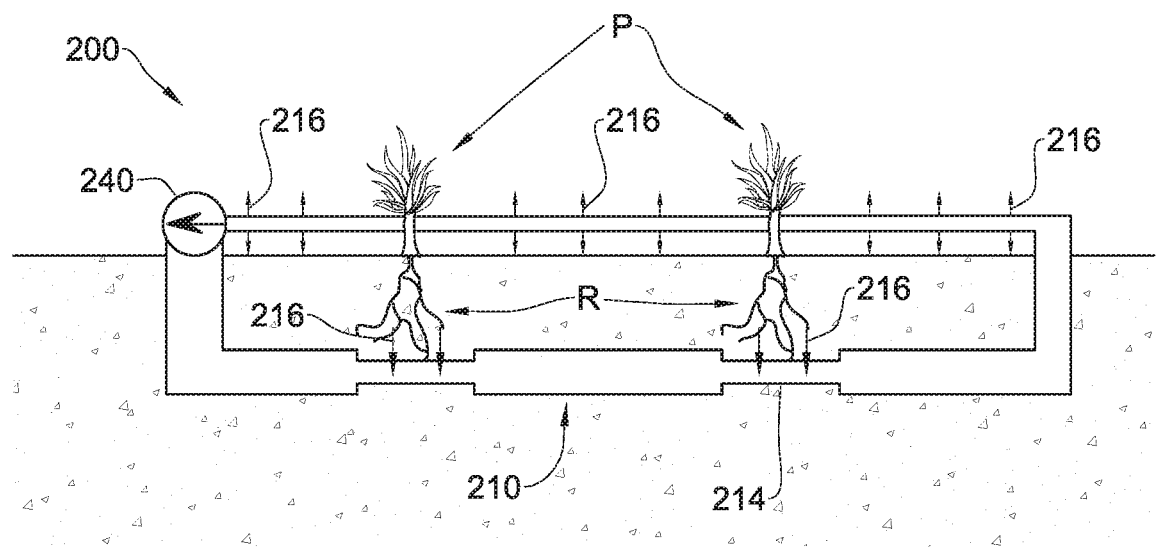
FIG. 1C is a schematic view of a closed loop heat delivery system according to a third example of the presently disclosed subject matter.
Figure 1D:
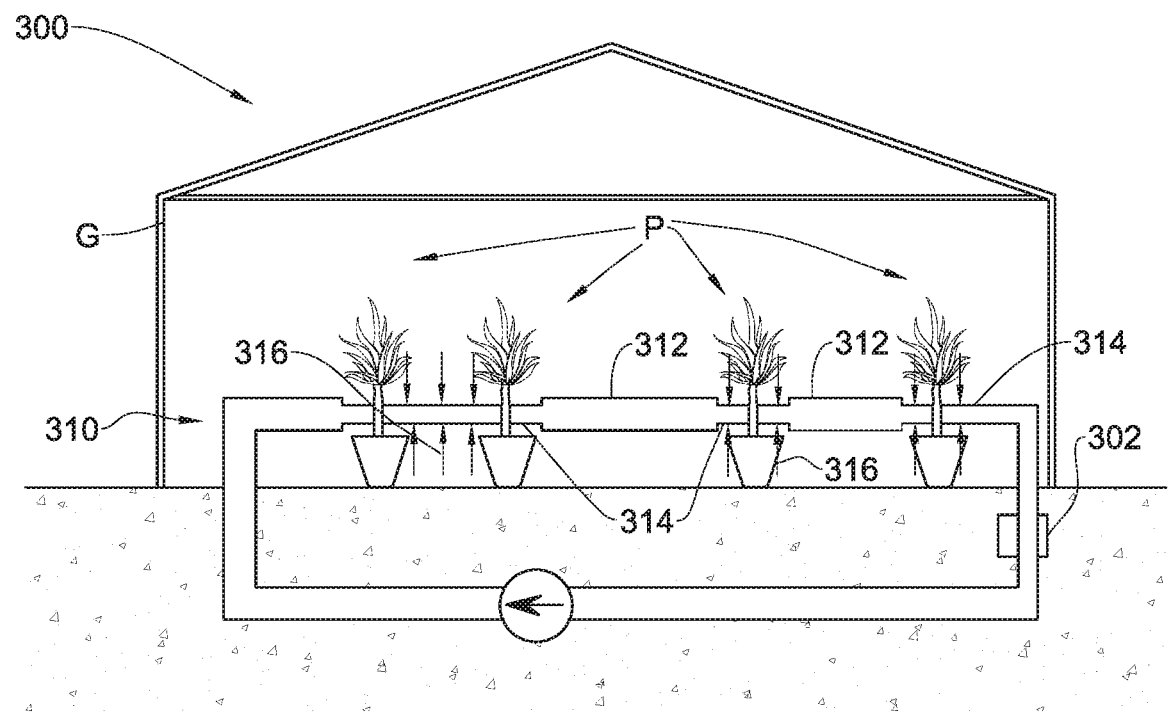
FIG. 1D is a schematic view of a heat delivery system, applied within a greenhouse, according to a forth example of the presently disclosed subject matter.

Reference is now made to FIGS. 1B to 1D, illustrating other examples of the heat transferring system in accordance with the presently disclosed subject matter, configured for use with the plant P, the roots R and the soil 8.

FIG. 1B illustrates an open loop heat delivery system 100. The fluid, represented by arrows 102 enters into a pipe 110 from a first end of the pipe 111, and is charged with heat from a heat source in the form of ground source heat exchanger 130. The fluid 102 is motivated to flow along the pipe 110 by pump 140. The pipe 110 is configured with alternate heat insulated segments 112 and heat transferring segments 114. The function of the heat insulated segments 112 and the heat transferring segments 114 is similar to that of heat insulated segments 12 and the heat transferring segments 14 by means of heat insulation and heat transfer. The pipe 110 comprises drip irrigation emitters 118 formed at the heat transferring segments 114, serving for discharging the fluid 102 from the pipe 110, and thereby irrigating the soil 8 accommodating the roots R. In this case, the fluid 102 can comprises materials such as fertilizers and pesticides. Alternatively, the emitters 118 can be disposed at the heat insulated segments 112 instead of or in addition to the heat transferring segments 114.

Reference is now made to FIG. 1C, illustrating a closed loop heat delivery system, generally designated 200, in which cooling of the roots R and their surrounding area is required. The heat accommodating fluid (not shown) is motivated by pump 240 and continuously flows within a closed loop formed by a pipe 210. It is repeatedly re-charged with heat and delivers heat from the surrounding of the roots R via heat transferring segments 214.

As can be seen, according to the example illustrated in FIG. 1C, heat (represented by arrows 216) is discharged from the surrounding of the roots R (i.e., root zone area of the roots R) to the heat accommodating fluid within the lower portion of the pipe 210 and then released at the upper portion of the pipe 210 pipe positioned above the ground level. The heat of the heat accommodating fluid is discharged via the upper portion of the pipe 210 to the atmospheric air. This example illustrates a situation in which cooling of the roots R is required.

Another example of a heat delivery system according to the presently disclosed subject matter, used for cooling heat consumers can be found in FIG. 1D. Heat delivery system 300 is a closed loop system, as was described with reference to heat delivery system 200, and is implemented within a greenhouse G, configured for growing plants P. A pipe 310 is disposed adjacent to the plants P, so as to deliver heat to the plants P, through heat transferring segments 314. Similarly to the heat delivery system 200, the heat delivery system 300 is also configured for cooling the plants P, i.e. delivers heat of negative value to the plants P. Arrows 316 represent heat, delivered from the plants P, through the sidewall of the heat transferring segments 314, and escapes the pipe to a cooling element 302 (e.g., ground source heat exchanger, chiller). As can be seen, heat insulated segments 312 do not allow heat exchange between the fluid within the pipe 310 and surroundings thereof.

As can further be seen in FIG. 1D, the heat transferring segments 314 are un-equally spaced from each other, and the plants P are spaced accordingly.

Figure 1E:
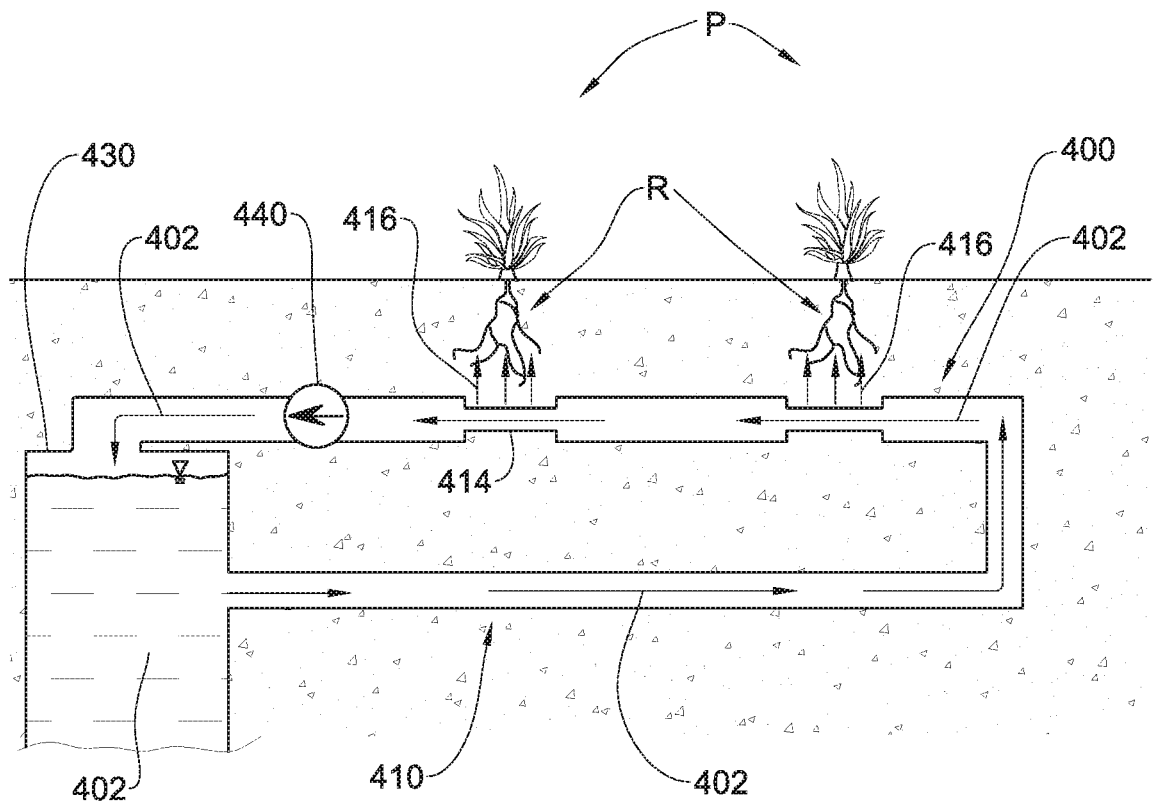
FIG. 1E is a schematic view of a closed loop heat delivery system according to a fifth example of the presently disclosed subject matter.

Reference is now made to FIG. 1E, illustrating a closed loop heat delivery system 400, having a natural heat source, namely a well 430. A heat accommodating natural fluid 402 disposed within the well 430 is propelled within a pipe 410 by a pump 440, while delivering heat to the roots R of plants P. The fluid 402 continuously flows within the pipe 410 and is repeatedly charged with heat in well 430 and delivers heat to the heat consumers (the heat delivery to the roots R is represented by arrows 416) via heat transferring segments 414. When used in conjunction with a natural heat source such as the well 430, the closed loop configuration allows using the heat of the well 430 without affecting the level of the natural fluid 402 within the natural heat source.

Figure 1F:
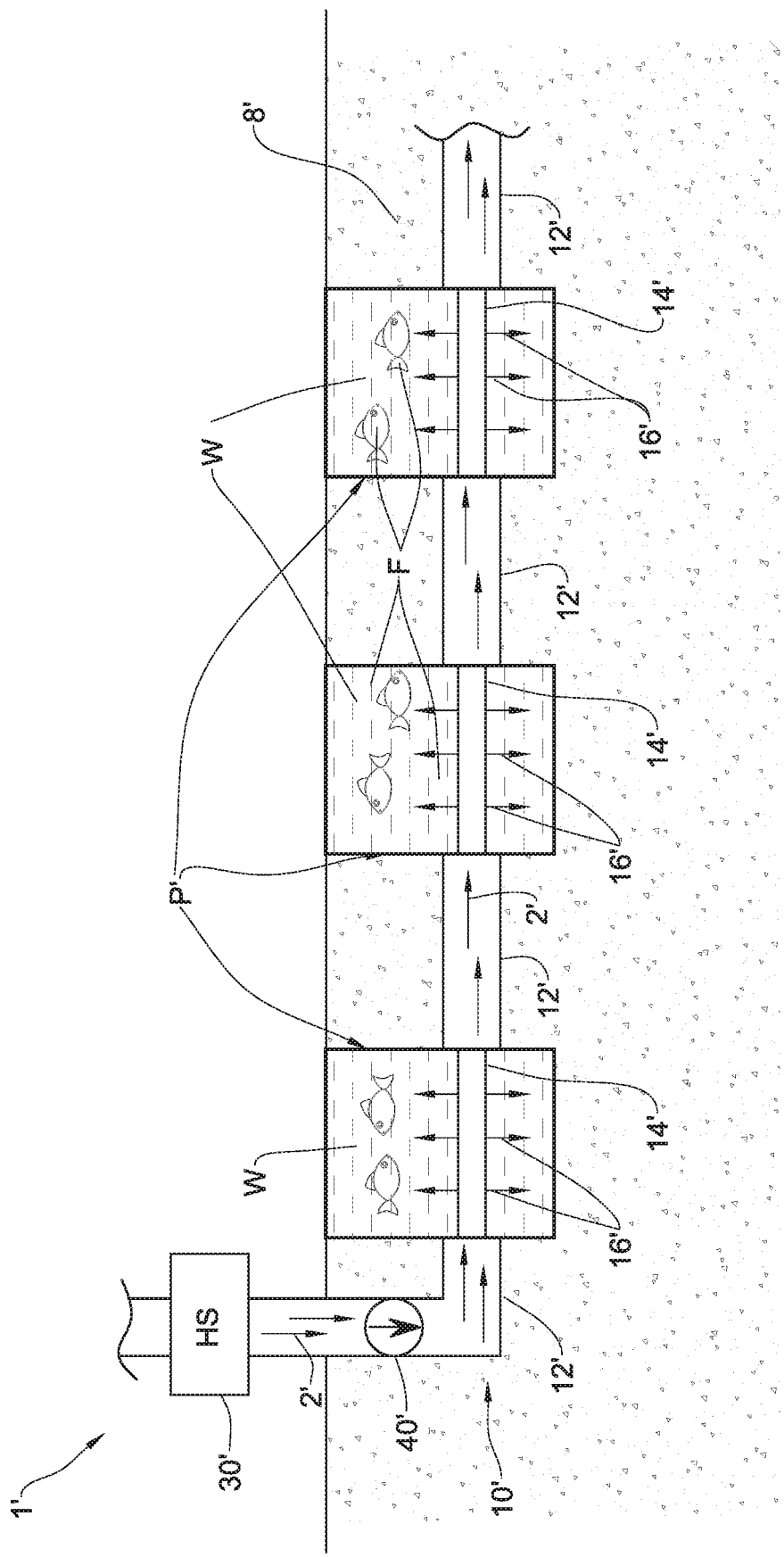
FIG. 1F is a schematic view of a heat delivery system according to another example of the presently disclosed subject matter.

Reference is now made to FIG. 1F in which a heat delivery system V is illustrated. The heat delivery system V is similar to the heat delivery system 1 of FIG. 1A, however configured for use in the field of aquaculture. The heat delivery system V is configured for delivering heat 16' to heat consumers which according to the present example are fish F swimming in water W, disposed in water pools P'. The heat delivery system 1' is configured for facilitating control of the temperature of the water, and thereby controlling the temperature of the fish F. The water pools P' are disposed within the ground and have an upper portion which is open to the atmosphere.

Influencing and controlling of the temperature of fish F is important for proper growth of the fish F, especially in warm climate during the daytime and cold climate during the nighttime. The heat delivery system 1' can function for both cooling and heating of the water W so as to maintain substantially permanent temperature thereof. Permanent and more stable temperature of the soil accommodating the roots R, or at least moderate changes of temperature along the day improves the growth of the plants P.

The heat delivery system 1' comprises piping in the form of a pipe 10', buried in the soil 8', and extending within the pools P'. The pipe 10' is configured for facilitating flow therethrough of a fluid 2', for delivering the heat 16' accommodated within the fluid 2' to the water W and the fish F.

The fluid 2' is charged with heat by a heat source 30', and is motivated to flow within the pipe 10' by a propelling arrangement, namely a pump 40'. The motivated fluid, with heat accommodated therewith flows through the pipe 10', and delivers the heat to the water W along its flow in the pipe 10', however at selected portions of the pipe 10', as will be explained herein below.

The pipe 10' is configured with alternate heat insulated segments 12' and heat transferring segments 14'. As will be detailed below, the heat insulated segments 12' are configured for decreasing heat exchange between the fluid 2' and surroundings of the pipe 10' to a minimum, while the heat transferring segments 14' are configured for increasing the heat exchange to a maximum. This kind of arrangement facilitates optimal use of the heat delivered to the fluid 2' from the heat exchanger 30', because it focuses the heat delivery to the heat consumers, i.e. to the water W and the fish F on one hand, and prevents or limits heat delivery from the fluid to areas not occupied by heat consumers.

In order to deliver the heat 16' to the water W and the fish F, and to prevent heat delivery to areas outside that pools P', the pipe 10' is configured in such a manner that each heat transferring segment 14' is disposed in proximity to its respective pool P' and is sized accordingly. In addition, the heat insulated segments 12' are disposed in proximity to areas not accommodating the pools P', thereby decreasing heat delivery to these areas. Such a configuration is obtained by designing the pipe 10' so as to comply with a given location of pools P'.

Reference is now made to FIGS. 2A to 2D, illustrating a pipe 510 according to an example of the presently disclosed subject matter.

The pipe 510, seen in FIGS. 2A to 2D, is configured with heat insulated segments 512 and heat transferring segments 514. The sidewall of the heat insulated segments 512 is configured with a plurality of ring-shaped lateral protrusions 522, projecting from the external surface of the sidewall and configured without lateral protrusions at the heat transferring segments 514.

The lateral protrusions 522 are configured for forming a plurality of heat insulating cavities 524, seen in FIGS. 2C and 2D, when a sleeve 526 is applied on the pipe 510. The heat insulating cavities 524 are formed between the lateral protrusions 522 and the sleeve 526. The sleeve 526 is snugly encapsulating the external surface of the sidewall at the heat transferring segments 514, and preferably leaving a minimum gap therebetween.

The heat insulating cavities 524 contain air and thereby provide the pipe with relatively high heat transfer coefficient at the heat insulated segments 512 (when compared to the heat transfer coefficient of the heat transferring segments 514).

According to another example, seen in FIGS. 2E and 2F, the heat insulating cavities 624 are filled with a solid insulating material, such as polyurethane foam 628 in the illustrated example. According to this example, the sleeve 526 can be added around the polyurethane foam 628, but not necessarily. Polyurethane foam is characterized with relatively high heat transfer coefficient, and thereby provides the pipe with insulation at heat insulation segments 612.

According to another example related to the pipe 710, there is provided pipe 710, seen in FIGS. 2G and 2H. The pipe 710 is a specific configuration related to the pipe 710, according to which the lateral protrusions 722 project inwardly, rather than outwardly as lateral protrusions 722 of pipe 710. Similarly to the heat insulating cavities 724 of pipe 710, heat insulating cavities 724 provide the sidewall of heat insulated segments 712 with relatively low heat transfer coefficient, when compared to that of the sidewall of heat transferring segments 714.

Referring now to FIGS. 3A and 3B, illustrating yet another example of a pipe according to the presently disclosed subject matter. The pipe 810 is configured with different wall thicknesses, so that the wall thickness at the heat insulated segments 852, referred to as $T_1$, is greater than the wall thickness at the heat transferring segments 854, referred to as $T_2$. Owing to the different wall thicknesses of the pipe 810, the heat transfer coefficient at the heat transferring segments 854 is greater than that of the heat insulated segments 852.

Yet another example of a pipe according to the present subject matter is shown in FIGS. 4A and 4B. The pipe 910 is provided with a heat insulating sheath 966, glued on the external surfaces the sidewall at the heat insulated segments 962, thereby increasing the heat transfer coefficient. According to the present example, the insulating sheath 966 is made of polyurethane foam.

The external surface of the sidewall at the heat transferring segments is not covered by the sheath 966, and therefore the heat transfer coefficient at the heat transferring segments 964 is greater than that of the heat insulated segments 962.

According to the example illustrated in FIGS. 5A and 5B, the pipe 1010 is configured with separate heat insulated segments 1072 and heat transferring segments 1074 assembled together, in an alternate order, so as to form continuous pipe. The heat insulated segments 1072 are provided with wall thickness $T_3$, greater than the wall thickness $T_4$ of the heat transferring segments 1074. In addition, the heat transferring segments 1074 are provided with a material with greater heat transfer coefficient than the material of the heat insulated segments 1072.

The segments according to the present example are assembled together by a plurality of pins 1075.

The pipe 1110, illustrated in FIGS. 6A to 6D, is configured with substantially linear, longitudinal protrusions 1183, extending along the heat insulated segments 1182, and are substantially parallel to a longitudinal axis of the pipe (FIGS. 6A-6C). A broader interpretation of this example, is with linear protrusions 1283 that are with an angle α with respect to a longitudinal axis of the pipe 1210 (FIG. 6D).

Similarly to the protrusions 522 of the pipe 510, the protrusions 1183 are configured for forming a plurality of heat insulating cavities 1185, seen in FIG. 6C, when a sleeve 1186 is applied on the pipe 1110. The heat insulating cavities 1185 are formed between the protrusions 1183 and the sleeve 1186. The sleeve 1186 is snugly encapsulating the external surface of the sidewall at the heat transferring segments 1184, and preferably leaving a minimum gap therebetween.

The heat insulating cavities 1185 contain air and thereby provide the pipe with relatively high heat transfer coefficient at the heat insulated segments 1182 (when compared to the heat transfer coefficient of the heat transferring segments 1184).

Referring now to FIGS. 7A to 7C, illustrating yet another example of a pipe according to the present subject matter. The pipe 1310 is configured with helical lateral protrusions 1393, extending around heat insulated segments 1392. The protrusions 1393 are configured for forming a plurality of heat insulating cavities 1395, seen in FIG. 7C, when a sleeve 1396 is applied on the pipe 1310. Heat insulating cavities 1395 are formed between the protrusions 1393 and the sleeve 1396. The sleeve 1396 is snugly encapsulating the external surface of the sidewall at the heat transferring segments 1394, and preferably leaving minimum gap therebetween.

According to a specific example of FIG. 7D, the helical protrusion 1493 extends along the entire length of the pipe 1410, i.e. along both the heat insulated segments 1492 and the heat transferring segments 1494, and the heat insulated segments 1492 are configured with sleeve segments 1496, forming the heat insulating cavities (not visible in FIG. 7D) between the helical protrusion 1493 and the sleeve segment 1496. The heat transferring segments 1494 are not covered with sleeves, and therefore are characterized with a greater heat transfer coefficient than that of the heat insulated segments 1492. The heat transferring segments 1494 further benefit from an increased external surface at the sidewalls thereof, thereby having a greater heat exchange surface when compared to a flat pipe.

According to another aspect of the presently disclosed subject matter, and in accordance with FIGS. 1A to 1D, and 2A to 2D, there is provided a method for heat delivery, for agricultural applications, the method comprising the steps of:

a. providing a heat delivery system 1, configured with a pipe 10 having alternate heat insulated segments 12 and heat transferring segments 14;

b. propelling a flow of a heat accommodating fluid 2 within the pipe 10, thereby delivering the heat accommodated therewith, through a sidewall of the heat transferring segments 14 of the pipe 10 to the soil 8 at surroundings thereof;

c. disposing the heat transferring segments 14 in proximity to the roots R of a respective plant P, so as to provide heat thereto.

Alternatively, the method can comprise a step of disposing the plants P in proximity to one or more heat transferring segments 14, as was described with reference to FIG. 1D.

According to yet another aspect of the presently disclosed subject matter, and in accordance with FIGS. 1A to 1D, and 2A to 2D, there is disclosed a method for manufacturing a heat delivery system 1 for agricultural applications, configured for delivering heat to a plurality of roots R of plants P. The method comprising the step of providing a pipe 10 with alternate heat insulated segments 12 and heat transferring segments 14 along the pipe 10, in such a manner that each heat transferring segment 14 is configured to be disposed in proximity to the roots R of one or more plants P, so as to deliver heat thereto.

The method further comprises the step of forming one or more lateral protrusions on the external surface of the sidewall of the heat insulated segments 12, and the step of applying a sleeve at least on the heat insulated segments 12, thereby forming a plurality of heat insulating cavities between the lateral protrusions and the sleeve.

With reference to FIGS. 4A and 4B, the method comprises the step of fixing an insulating sheath 966, the pipe 910, at least at the heat insulated segments 962, so as to increase the insulation thereby. The sheath can be fixed to the pipe by gluing, heat welding, heat shrinking, and other known methods for fixing a sheath to a pipe.

With reference to FIGS. 5A and 5B, the heat insulated segments 1072 and the heat transferring segments 1074 are formed separately, and are assembled together, in an alternate order, so as to form continuous pipe 1010.

Figure 8A:
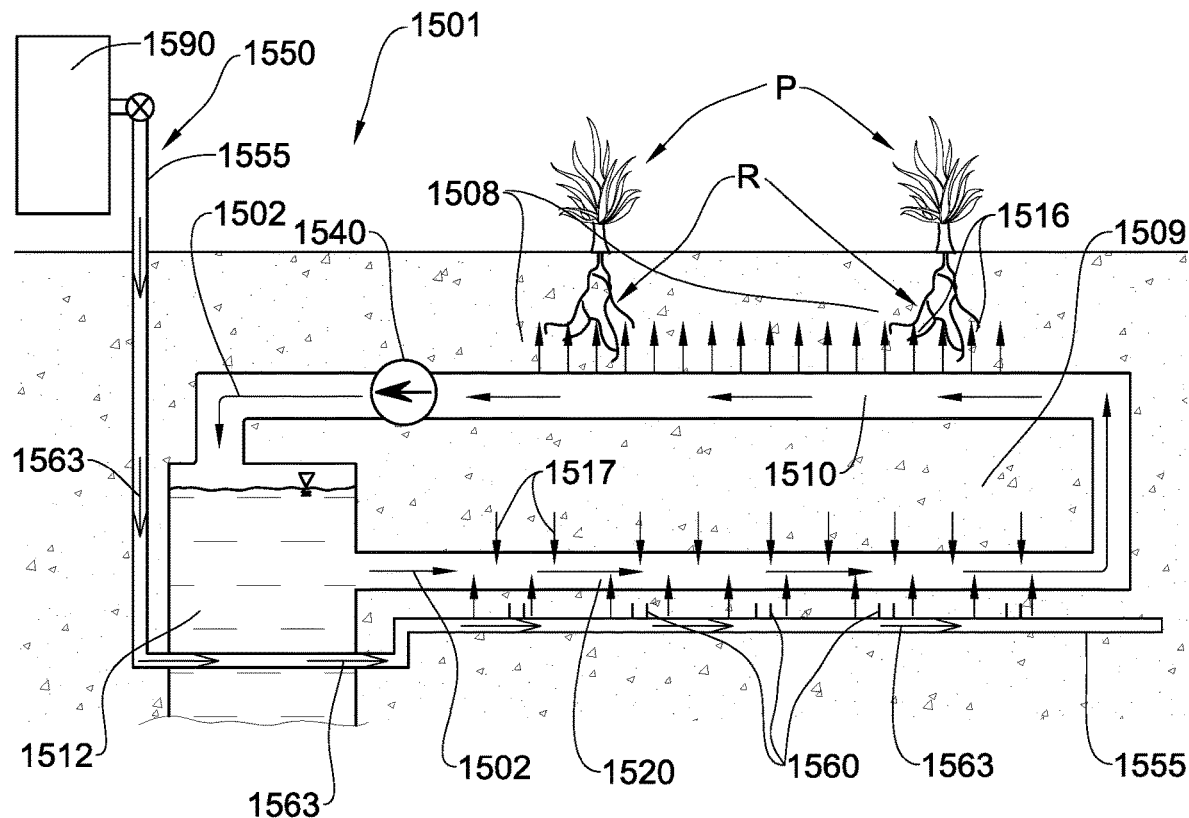
FIG. 8A is a schematic view of a ground source heat delivery system according to one example of the presently disclosed subject matter.

Reference is now made to FIG. 8A of the drawings, illustrating a first example of a ground source heat delivery system according to the present disclosure, generally designated 1501. The ground source heat delivery system 1501 is a closed loop system applied in an agricultural field for growing plants P, and is configured for delivering heat to heat consumers which according to the present example are the roots R of the plants P, growing in an agricultural soil 1508. The ground source heat delivery system 1501 is configured for influencing root zone temperature (i.e., the temperature at the surrounding of the roots R) and facilitating control of the temperature of the soil 1508 accommodating the roots R.

Influencing and controlling of the temperature of roots R of plants P is important, for example, in areas characterized by a significant temperature difference, e.g. warm climate during the daytime and cold climate during the nighttime. The ground source heat delivery system 1501 can function for both cooling or heating of the soil 1508 (or any substrate or growing media or fluid) accommodating the roots R so as to maintain substantially permanent temperature thereof. Permanent and more stable temperature of the soil accommodating the roots R, or at least moderate changes of temperature along the day improves the growth of the plants P.

The ground source heat delivery system 1501 is configured for receiving heat 1517 from soil 1509 disposed at a deep level of the ground (more than 1.5 meter under the ground), and transferring the heat to the soil 1508 disposed at a shallow level of the ground (about 0.5 meter under the ground). The temperature of the soil 1509 is more stable than the temperature of the soil 1508 because it is deeper and can be less influenced by temperature above the ground. The temperature of the soil 1509 is usually between about 18° C. to about 22° C.

The ground source heat delivery system 1501 comprises a first bottom pipe 1520 buried within the soil 1509, facilitating flow of the heat accommodating fluid 1502 therein from a fluid source, i.e., an aquifer 1512 and transferring the heat 1517 from the soil 1509 thereto through sidewalls of the bottom pipe 1520. The ground source heat delivery system 1501 further comprises a second top pipe 1510 in fluid communication with the bottom pipe 1520 for facilitating flow of the heat accommodating fluid 1502 therethrough and transferring heat 1516 of the heat accommodating fluid 1502 to the roots R through sidewalls of the top pipe 1510. The ground source heat delivery system 1501 further comprises a fluid pump 1540 in fluid communication with the bottom pipe 1520 and said top pipe 1510, and configured for propelling the heat accommodating fluid 1502.

It should be indicated that according to other examples, the bottom pipe 1520 can be buried at a much deeper location (e.g., 3 meters under the ground), so as to be surrounded by soil having a more stable value of temperature.

The ground source heat delivery system 1501 further comprises a fluid emitting system 1550 which is an open loop system. The fluid emitting system 1550 comprises an emitting pipe 1555 buried within the soil 1509 and extending along the bottom pipe 1520. The emitting pipe 1555 is in fluid communication with a fluid source 1590. The emitting pipe 1555 is configured with a plurality of emitters 1560 configured for emitting fluid 1563 at the soil 1509 surrounding the bottom pipe 1520. The emitters 1560 are selectively activated emitters the activation of which depends on the pressure within the emitting pipe 1555. In operation, the fluid 1563 that is emitted from the emitters 1560 is wetting the soil 1509 surrounding the bottom pipe 1520 so as to increase heat conductivity of the soil 1509 and to improve heat transfer from the soil 1509 to the bottom pipe 1510, and in particular to the heat accommodating fluid 1502 flowing therein. It is known in the art that heat conductivity of a soil depends on the type of the soil and on its wetness. Although the type of the soil in uncontrollable, the wetness of the soil can be changed by wetting the soil in a controlled manner This allows improving the heat conductivity of the soil 1509 and improving transfer of heat from the soil 1509 to the heat accommodating fluid 1502.

The heat delivery system 1501 further comprises a top pipe 1510, buried in the soil 1508, in proximity to the roots R. The top pipe 1510 is configured for facilitating flow therethrough of a fluid 1502, for delivering heat accommodated within the fluid 1502 to the soil 1508 accommodating the roots R.

The fluid 1502 is motivated to flow between the top pipe 1510 and the bottom pipe 1520 by a pump 1540. Arrows 1516 refer to heat delivered from the heat accommodating fluid 1502 to surroundings of the top pipe 1510, and in particular to the roots R.

Figure 8B:
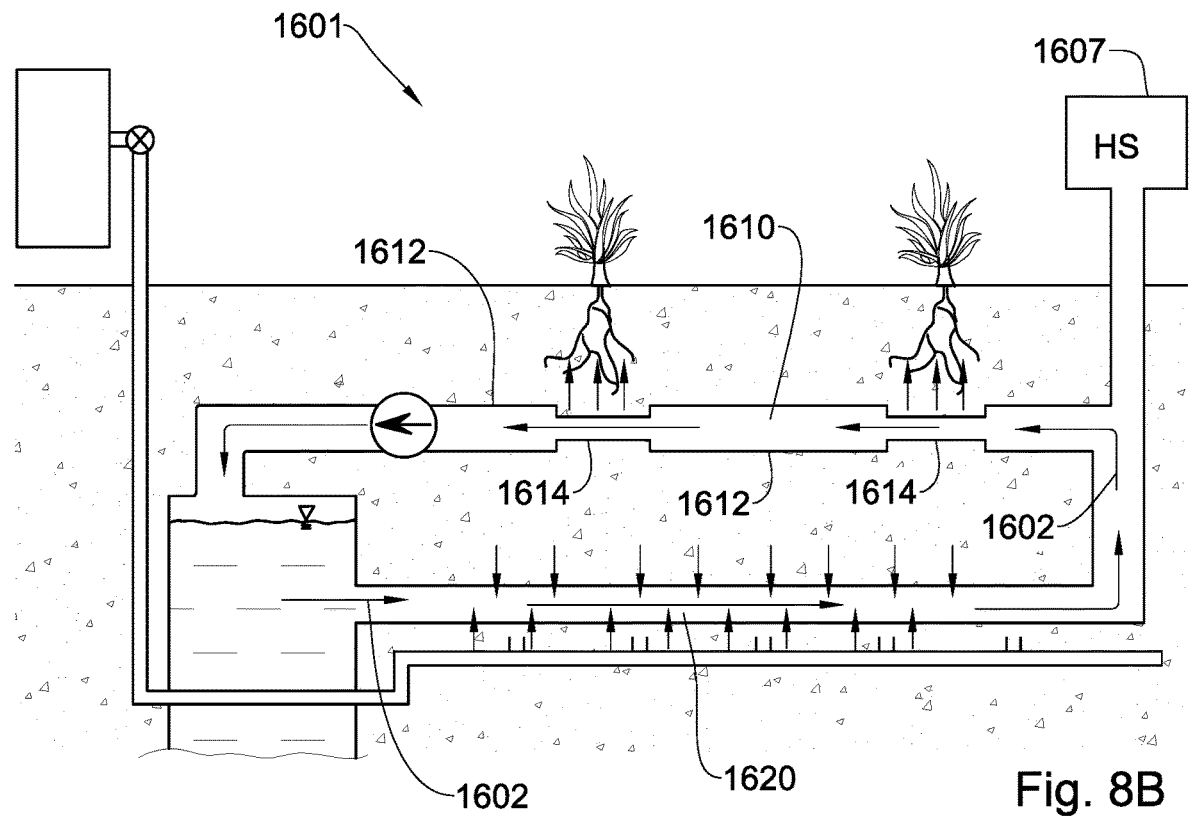
FIG. 8B is a schematic view of a ground source heat delivery system according to a second example of the presently disclosed subject matter.

Reference is now made to FIG. 8B, illustrating another example of a ground source heat delivery system 1601. The ground source heat delivery system 1601 is similar to the ground source heat delivery system 1501 of FIG. 8A, however having two additional features. The first additional feature is a heat source 1607 which is in fluid communication with a top pipe 1610. The heat source 1607 is configured for delivering heat to a heat accommodating fluid 1602 flowing between the top pipe 1610 and a bottom pipe 1620. The second additional feature is that the top pipe 1610 has alternate heat insulated segments 1612 and heat transferring segments 1614.

The heat insulated segments 1612 and heat transferring segments 1614 are illustrated in FIG. 8B only for schematic purposes, and it should be indicated that they can have any one of the characteristics of the heat insulated segments and the heat transferring segments of FIGS. 1A-1E, 2A-2H, 3A, 3B, 4A, 4B, 5A, 5B, 6A-6D and 7A-7D.

Figure 8C:
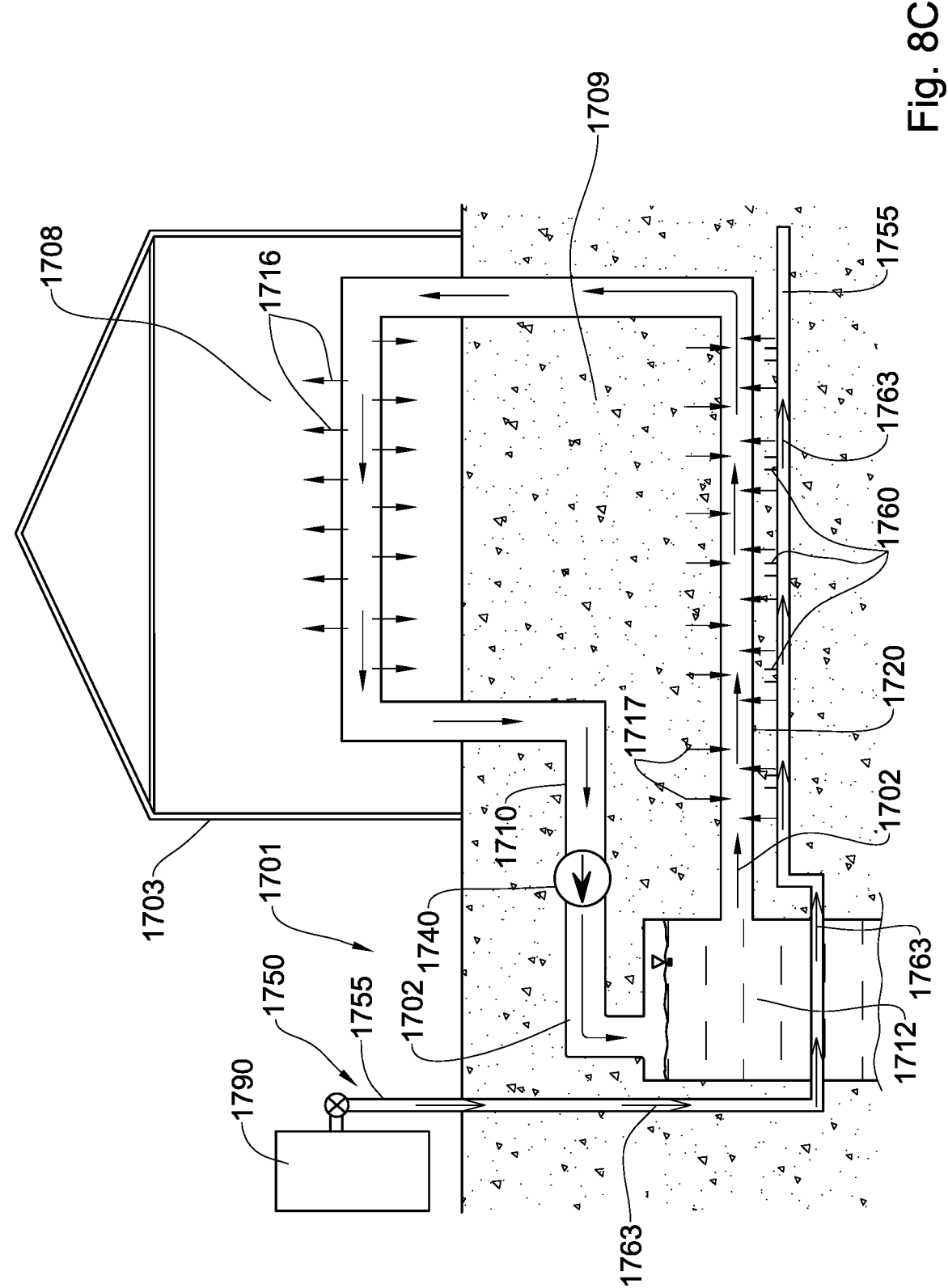
FIG. 8C is a schematic view of a ground source heat delivery system according to a third example of the presently disclosed subject matter.

Reference is now made to FIG. 8C of the drawings, illustrating a third example of a ground source heat delivery system according to the present disclosure, generally designated 1701. The ground source heat delivery system 1701 is a closed loop system applied for heating a conventional home 1703. The ground source heat delivery system 1701 is configured for control of the temperature of air 1708 within the home 1703.

Influencing and controlling of the temperature of air 1708 can be important, for example, during warm climate during the daytime and cold climate during the nighttime. The ground source heat delivery system 1701 can function for both cooling or heating of the air 1708 so as to maintain substantially permanent temperature thereof.

The ground source heat delivery system 1701 is configured for receiving heat 1717 from soil 1709 disposed at a deep level of the ground (more than 1.5 meters under the ground), and transferring the heat to the air 1708 disposed within the home 1703. The temperature of the soil 1709 is more stable than the temperature of the air 1708 because it is deeper and can be a less influence on temperature above the ground. The temperature of the soil 1709 is usually between about 18° C. to about 22° C.

The ground source heat delivery system 1701 comprises a first bottom pipe 1720 buried within the soil 1709, facilitating flow of the heat accommodating fluid 1702 therein from a fluid source, i.e., a well 1712 and transferring the heat 1717 from the soil 1709 thereto through sidewalls of the bottom pipe 1720. The ground source heat delivery system 1701 further comprises a second top pipe 1710 in fluid communication with the bottom pipe 1720 for facilitating flow of the heat accommodating fluid 1702 therethrough and transferring heat 1716 of the heat accommodating fluid 1702 to the air 1708. The ground source heat delivery system 1701 further comprises a fluid pump 1740 in fluid communication with the bottom pipe 1720 and said top pipe 1710, and configured for propelling the heat accommodating fluid 1702.

It should be indicated that according to other examples, the bottom pipe 1720 can be buried at a much deeper location (e.g., 3 meters under the ground), so as to be surrounded by soil having a more stable value of temperature.

The ground source heat delivery system 1701 further comprises a fluid emitting system 1750 which is an open loop system. The fluid emitting system 1750 comprises an emitting pipe 1755 buried within the soil 1709 and extending along the bottom pipe 1720. The emitting pipe 1755 is in fluid communication with a fluid source 1790. The emitting pipe 1755 is configured with a plurality of emitters 1760 configured for emitting fluid 1763 at the soil 1709 surrounding the bottom pipe 1720. The emitters 1760 are selectively activated emitters the activation of which depends on the pressure within the emitting pipe 1755. In operation, the fluid 1763 that is emitted from the emitters 1760 is wetting the soil 1709 surrounding the bottom pipe 1720 so as to increase heat conductivity of the soil 1709 and to improve heat transfer from the soil 1709 to the bottom pipe 1710, and in particular to the heat accommodating fluid 1702 flowing therein. It is known in the art that heat conductivity of a soil depends on the type of the soil and on its wetness. Although the type of the soil in uncontrollable, the wetness of the soil can be changed by wetting the soil in a controlled manner This allows improving the heat conductivity of the soil 1709 and improving transfer of heat from the soil 1709 to the heat accommodating fluid 1702.

The invention claimed is:

1. A heat delivery system for agricultural applications, the system comprising:
   one or more pipes, each having alternate heat insulated segments and heat transferring segments at least a portion of said segments passing through a medium to be heated, each of said one or more pipes being configured with a respective fluid flow path extending through the alternating heat insulated segments and heat transferring segments thereof in a closed loop fluid flow system with a heat source wherein sidewalls of the heat insulated segments are configured with at least one heat insulating sheath applied to, or one or more lateral protrusions projecting from internal or external surfaces of the sidewalls;
   a fluid emitting system comprising at least one emitting pipe configured with a plurality of emitters configured for emitting fluid at surroundings of the one or more pipes, wherein at least one of said one or more pipes and said at least one emitting pipe constitute a single pipe in which said emitters are disposed at the heat transferring segments for emitting the fluid; and
   at least one fluid propelling arrangement configured for motivating flow of heat accommodating fluid within at least one of said fluid flow paths.

2. The heat delivery system according to claim 1, wherein the heat transferring segments are disposed along the respective pipe according to a predetermined arrangement, so that the location of each heat transferring segment is corresponding to the location of a respective heat consumer in proximity to which the heat transferring segment is to be disposed.

3. The heat delivery system according to claim 1, further comprising a sleeve, wherein the one or more lateral protrusions are configured for forming one or more heat insulating cavities between the lateral protrusions and the sleeve when the sleeve is applied over the lateral protrusions.

4. The heat delivery system according to claim 1, wherein the heat insulated segments and heat transferring segments include different materials, each material having a different heat transfer coefficient.

5. The heat delivery system according to claim 1, wherein said emitters are drip irrigation emitters or spray emitters.

6. A method for heat delivery, the method comprising the steps of:
   a. providing a heat delivery system configured with:
      one or more pipes, each having alternate heat insulated segments and heat transferring segments, at least a portion of said segments passing through a medium to be heated and forming a closed loop fluid flow system, and the sidewalls of the heat insulated segments being configured with at least one heat insulating sheath applied to, or one or more lateral protrusions projecting from internal or external surfaces of the sidewalls, and
      a fluid emitting system comprising at least one emitting pipe configured with a plurality of emitters configured for emitting fluid at surroundings of the one or more pipes, at least one of said one or more pipes and said at least one emitting pipe constituting a single pipe in which said emitters are disposed at the heat transferring segments for emitting the fluid; and
   b. propelling flow of a heat accommodating fluid within at least one of the one or more pipes, thereby delivering the heat accommodated therewith, through sidewalls of the respective heat transferring segments of the one or more pipes to surroundings thereof.

7. The method according to claim 6, further comprising disposing the heat transferring segments in proximity to one or more heat consumers.

8. A method for manufacturing a heat delivery system, configured for delivering heat to a plurality of heat consumers, the method comprising providing one or more pipes with multiple, alternating heat insulated segments and heat transferring segments along the respective pipes, wherein a respective closed loop fluid flow path coextends through the alternating heat insulated segments and heat transferring segments of each of the one or more pipes, providing a fluid emitting system comprising at least one emitting pipe configured with a plurality of emitters, wherein at least one of said one or more pipes and said at least one emitting pipe constitute a single pipe in which said emitters are disposed at the heat transferring segments for emitting the fluid, and forming at least one heat insulating sheath or one or more lateral protrusions on internal or external surfaces of sidewalls of the heat insulated segments.

9. The method according to claim 8, further comprising applying a sleeve at least over the heat insulated segments, thereby forming one or more heat insulating cavities between the lateral protrusions and the sleeve.

10. A ground source heat delivery system, comprising:
    at least one first pipe configured to be buried within soil, facilitating flow of a heat accommodating fluid therein and transferring heat from the soil thereto through sidewalls of the first pipe;
    at least one second pipe disposed above the first pipe when the first pipe is buried within the soil, said second pipe being in fluid communication with the first pipe for facilitating flow of said heat accommodating fluid therethrough and transferring heat of said heat accommodating fluid to at least one heat consumer through sidewalls of the second pipe, wherein said at least one first pipe and said at least one second pipe constitute elements of a closed loop fluid flow system;

a fluid propelling arrangement in fluid communication with said first pipe and said second pipe, configured for propelling said heat accommodating fluid; and a fluid emitting system comprising at least one emitting pipe configured to be buried within said soil and to extend at least partially along said first pipe, said emitting pipe being configured with a plurality of emitters configured for emitting fluid at the soil surrounding the first pipe, wherein fluid flow within the fluid emitting system is separate from fluid flow within the closed loop fluid flow system.

11. The ground source heat delivery system of claim 10, further comprising a fluid source in fluid communication with the first pipe and the second pipe, for supplying said heat accommodating fluid thereto.

12. The ground source heat delivery system of claim 10, further comprising a heat source configured for delivering heat to the heat accommodating fluid.

13. The ground source heat delivery system of claim 10, wherein said fluid propelling arrangement constitute an element of the closed loop fluid flow system.

14. The ground source heat delivery system of claim 10, wherein said fluid emitting system is an open loop system.

15. A method for heat delivery, comprising the steps of:
providing a ground source heat delivery system, comprising:

at least one first pipe buried within soil and facilitating flow of a heat accommodating fluid therein, at least one second pipe above the first pipe and in fluid communication with the first pipe for facilitating flow of said heat accommodating fluid therethrough, wherein said at least one first pipe and said at least one second pipe constitute elements of a closed loop fluid flow system, a fluid propelling arrangement in fluid communication with said first pipe and said second pipe, and a fluid emitting system comprising at least one emitting pipe extending at least partially along said first pipe and configured with a plurality of emitters, wherein fluid flow within the fluid emitting system is separate from fluid flow within the closed loop fluid flow system;

propelling said heat accommodating fluid by said fluid propelling arrangement between said second pipe and said first pipe;

transferring heat from the soil to the heat accommodating fluid through sidewalls of the first pipe;

transferring heat from the heat accommodating fluid to at least one heat consumer through sidewalls of the second pipe; and emitting fluid by said emitters at the soil surrounding the first pipe, and thereby wetting the soil and increasing heat conductivity thereof.

\* \* \* \* \*